United States Patent [19]
Wood et al.

[11] Patent Number: 5,801,948
[45] Date of Patent: Sep. 1, 1998

[54] UNIVERSAL CONTROL SYSTEM WITH ALARM HISTORY TRACKING FOR MOBILE MATERIAL DISTRIBUTION APPARATUS

[75] Inventors: John E. Wood, Franklin; Joel T. Morton, Springfield, both of Ill.

[73] Assignee: Dickey-john Corporation, Auburn, Ill.

[21] Appl. No.: 697,311

[22] Filed: Aug. 22, 1996

[51] Int. Cl.⁶ .................................................. G06F 11/00
[52] U.S. Cl. ........................ 364/468.15; 364/468.16; 364/168.23; 701/29; 701/35; 340/438; 340/439
[58] Field of Search .......................... 364/468.15, 468.2, 364/468.16, 468.22, 468.23, 424.07, 424.034, 424.04, 551.01, 550, 551.21; 239/74, 156, 159, 722, 726, 172, 390; 701/29, 33–35, 39, 50; 340/438, 439, 461

[56] References Cited

U.S. PATENT DOCUMENTS

| | | | |
|---|---|---|---|
| 4,277,022 | 7/1981 | Holdsworth et al. | 239/156 |
| 4,392,611 | 7/1983 | Bachman et al. | 239/74 |
| 4,523,280 | 6/1985 | Bachman | 364/424 |
| 4,663,725 | 5/1987 | Truckenbrod et al. | |
| 4,803,626 | 2/1989 | Bachman et al. | 364/424.07 |
| 4,908,746 | 3/1990 | Vaughn | |
| 4,924,418 | 5/1990 | Bachman et al. | 364/424.03 |
| 5,027,293 | 6/1991 | Pung et al. | |
| 5,034,894 | 7/1991 | Abe | |
| 5,453,939 | 9/1995 | Hoffman et al. | 364/424.03 |
| 5,491,631 | 2/1996 | Shirane et al. | 364/424.04 |
| 5,521,842 | 5/1996 | Yamada | |
| 5,634,039 | 5/1997 | Simon et al. | |

FOREIGN PATENT DOCUMENTS

| | | |
|---|---|---|
| 528396 | 2/1993 | European Pat. Off. |
| 3309920 | 9/1984 | Germany |

*Primary Examiner*—James P. Trammell
*Assistant Examiner*—Bryan Bui
*Attorney, Agent, or Firm*—Leydig, Voit & Mayer, Ltd.

[57] ABSTRACT

A control system for controlling the operation of a mobile distribution apparatus is disclosed. The disclosed control system includes an alarm tracking system wherein any errors noted by the control system are recorded in an addressable memory in chronological order. This addressable memory can be read out at any time in order to perform diagnostics and the like. In order to control the length of the list of errors generated by the system, the system will only record the same error three times. Upon the fourth occurrence of a given error, the oldest record of the error is deleted. In addition, the control system classifies errors into distinct categories and provides the user of the system with both audible and visual indications of the occurrence of an error.

23 Claims, 26 Drawing Sheets

UNIVERSAL CONTROL SYSTEM WITH ALARM HISTORY TRACKING FOR MOBILE MATERIAL DISTRIBUTION APPARATUS

FIELD OF THE INVENTION

This invention relates generally to control systems and more particularly to a universal control system with alarm history tracking for mobile material distribution apparatus such as farm implements and public works vehicles.

BACKGROUND OF THE INVENTION

Control systems for controlling the operation of mobile material distribution apparatus have been known for some time. Generally, these control systems are used to control the rates at which various products are dispersed or distributed. Exemplary applications where such control systems have been used include the control of farm machinery and implements such as sprayers and planters, and the control of public works vehicles such as salt spreaders for road maintenance and the like. U.S. Pat. Nos. 4,630,773 and Re. 35,100, which are both hereby incorporated by reference, disclose the use of microprocessor based control systems wherein the ground speed and the precise field position of the distribution apparatus, as well as the type of soil and other factors are monitored and employed to distribute a controlled amount of material throughout a field in farming applications.

Prior art control systems have suffered from certain drawbacks. For example, early control systems were dedicated products designed for use with a specific implement or machine having a specific application. Under such an approach, it is necessary to have a dedicated control system for each material distribution apparatus owned. Thus, if a farmer utilizes both a sprayer and a planter on his/her farm, that farmer would require a dedicated control system for each of these two implements. As a result, the end user incurred excessive costs in both purchasing and maintaining two separate control systems as well as in providing training for multiple systems if more than one type of control system is employed.

Efforts have been made to produce universal control systems which can be used with more than one kind of material distribution apparatus. U.S. Pat. No. 4,803,626 and U.S. Pat. No. 4,924,418, which are both hereby incorporated by reference, disclose monitoring and control systems which achieve such universality. However, control systems such as these are generally disposed within the cab of the vehicle they service. Not only does this result in excessive wiring within the cab, but it also makes switching between implements onerous, if not impossible.

More specifically, control systems typically require numerous inputs from sensors and actuators disposed on the implements they control. In order to switch from one implement to another, numerous cables must be disconnected and others must be connected, thereby causing both time delays and the possibility of poorly connected and/or incorrectly connected wiring. Even after such wiring is completed correctly, prior art control systems require substantial software changes and configuration adjustments to adapt the system to the newly attached material distribution apparatus. Thus, switching between distribution devices with a single control system has often been difficult and time consuming.

While some prior art systems reduced the amount of wiring in the cab by using a serial bus to connect system components, such as the system described in U.S. Pat. No. 5,260,875, which is incorporated by reference herein, such systems lack a universal terminal, thus requiring hardware changes in order to effect a change in system application.

Prior art control systems have suffered from additional drawbacks. For example, although prior art systems have had the ability to control and monitor the operation of booms in farming applications, this control has been very limited. More specifically, a boom is an elongated distribution tube usually positioned in a horizontal plane parallel to the ground, and having a plurality of nozzles or, in the case of booms for granular applications, distribution ports spaced along its length. Typically, a product to be dispensed is pumped into the elongated tube which delivers the product to the nozzles (or distribution ports) which, in turn, distribute the product onto the surface to be treated.

Prior art control systems have had the capability of monitoring the operating state of the nozzles/distribution ports (i.e., open or closed), and, depending upon those operating states, adjusting the amount of product delivered to the tube to regulate the dispersal of the product to the field. However, these prior art systems did not monitor which of the nozzles/distribution ports were open or closed. These same systems often employ the global positioning system ("GPS") to monitor the amount of dispersant applied across a surface and to create a mapped record of such amounts. By ignoring which of the boom nozzles/distribution ports are open and which are closed, these prior art systems necessarily resulted in inaccurate GPS maps; overestimating amounts in areas where the boom nozzles/distribution ports were off during a second run across a previously treated area, and failing to note missed swaths during a first run.

Moreover, in some instances booms include two fence row nozzles, one at each opposite end of the elongated distribution tube. In other instances, booms include only a single fence row nozzle disposed at one of its ends. Fence row nozzles usually have twice the capacity of the other nozzles on the boom and are typically used to spray the outer edge of a field, ditch bank or fence row adjacent to the field being serviced. Prior art control systems have ignored these fence row nozzles altogether. Thus, when one or more fence row nozzles are in use, the application rate selected by the control system for the product being dispersed can be inaccurate. In addition, since prior art control systems ignore the fence row nozzles, the material dispersed therethrough will not be recorded by GPS and the GPS maps will be inaccurate.

Prior art control systems have also provided limited alarm systems. For example, when an error occurred, these systems typically would display a cryptic code on a display and would make an audible sound. The sound was typically the same regardless of the error. Thus, the audible error information provided by these systems provided no indication of the nature of the error. Further, the error message usually disappeared from the LCD within a relatively short period of time and was gone forever. Therefore, if the user did not read the error message within a relatively short time after the audible alarm sounded, he/she would never know the nature of the error message.

OBJECT OF THE INVENTION

It is a general object of the invention to provide an improved universal control system for mobile material distribution apparatus. More specifically, it is an object of the invention to provide an improved universal control system which can be used to control material distribution apparatus which are designed for virtually any application. It is a more specific object to provide such a control system which can switch between distribution apparatus with minimum delays. It is a related object to provide such a system which can switch between apparatus and be ready for operation by disconnecting and reconnecting one cable with minimal software configuration changes. It is a further related object to provide such a system wherein any needed software configuration changes are performed via a user friendly, menu driven, interface.

It is a further object to provide a control system for material distribution apparatus which minimizes the wiring contained within the cab of a distributing vehicle employing the system. It is a related object to provide such a control system which can receive feedback signals from the controlled distribution apparatus and which can perform substantially all calculations necessary to control the apparatus outside of the vehicle's cab.

It is another object of the invention to provide a control system which monitors the operating states of the nozzles/distribution ports of one or more controlled booms. It is a related object to provide such a system wherein the operating states of the nozzles/distribution ports are graphically depicted to the user. It is another related object to utilize the nozzle/distribution ports operating state information to provide a remote control system such as the GPS system with more accurate information concerning the material dispensed by one or more controlled booms.

It is yet another object to provide a control system which monitors the operating state of the fence row nozzle(s) of one or more controlled booms. It is a related object to provide such a system wherein the operating states of the fence row nozzles are graphically depicted to the user along with the other nozzles of the boom. It is another related object to utilize the information concerning the operating state(s) of the fence row nozzle(s) to more accurately control the dispensation rates of the boom(s). It is another related object to utilize the fence row nozzle information to provide a remote control system such as the GPS system with more accurate information concerning the material dispensed by one or more controlled booms.

It is still another object of the invention to provide a universal control system for material distribution apparatus that provides a user with detailed error information. It is a related object to provide such a system wherein errors are classified and wherein distinct audible outputs are provided for each class of error. It is yet another related object to provide such a system wherein error messages are stored for later analysis.

SUMMARY OF THE INVENTION

The present invention accomplishes these objectives and overcomes the drawbacks of the prior art by providing a control system for controlling the operation of a mobile material distribution device. The control system includes an input device and an output device for interacting with a user. It also includes a microprocessor having at least one input port and at least one output port arranged to form at least one feedback loop for controlling an attached material distribution apparatus. The microprocessor is adapted to detect errors. The control system further includes a memory associated with the microprocessor for strong error identification information received from the microprocessor.

These and other features and advantages of the invention will be more readily apparent upon reading the following description of the preferred embodiment of the invention and upon reference to the accompanying drawings wherein:

DESCRIPTION OF A PREFERRED EMBODIMENT

Figure 1A:
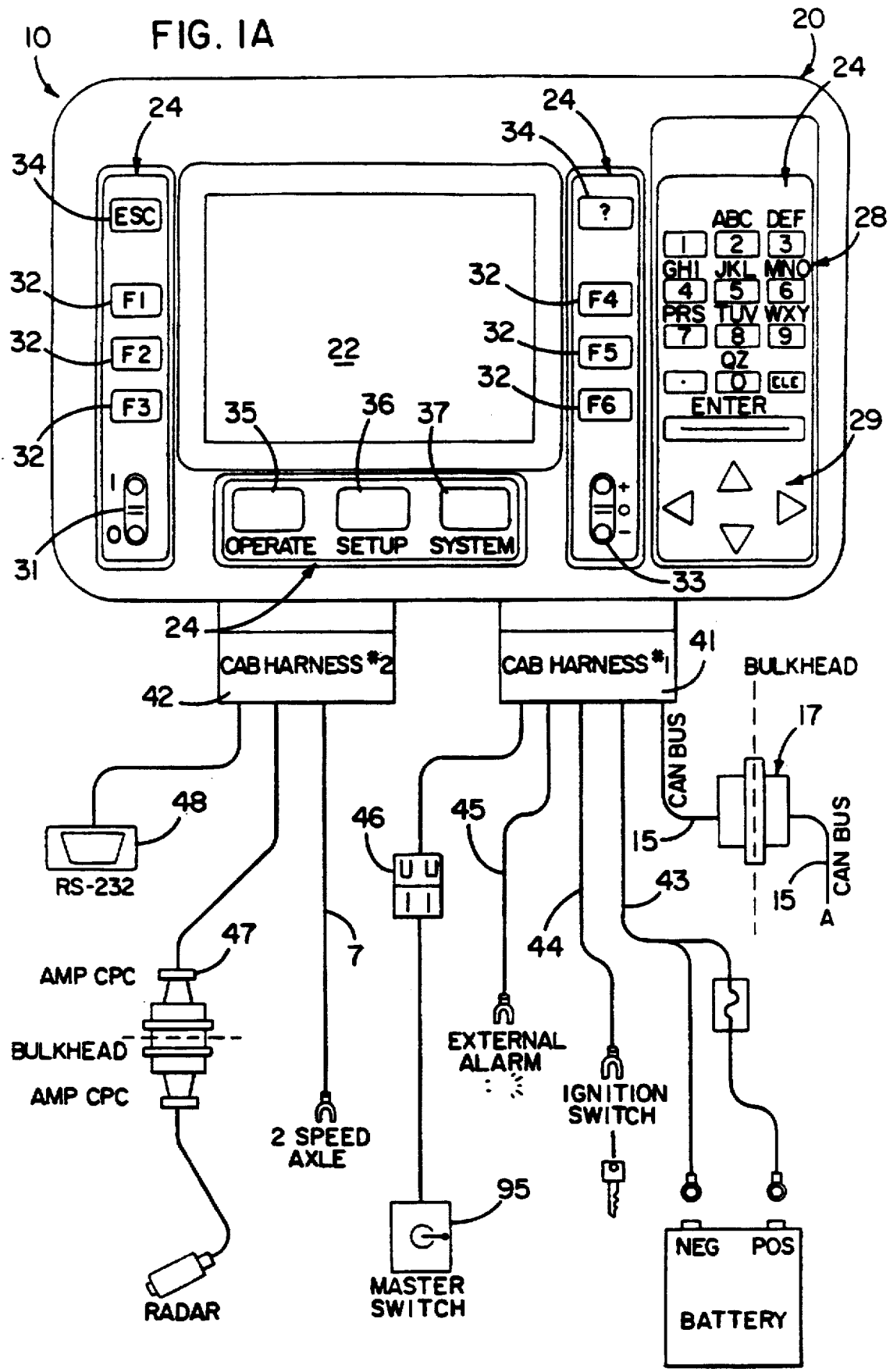
FIGS. 1A and 1B are schematic diagrams illustrating a universal modular control system constructed in accordance with the teachings of the invention.
Figure 1B:
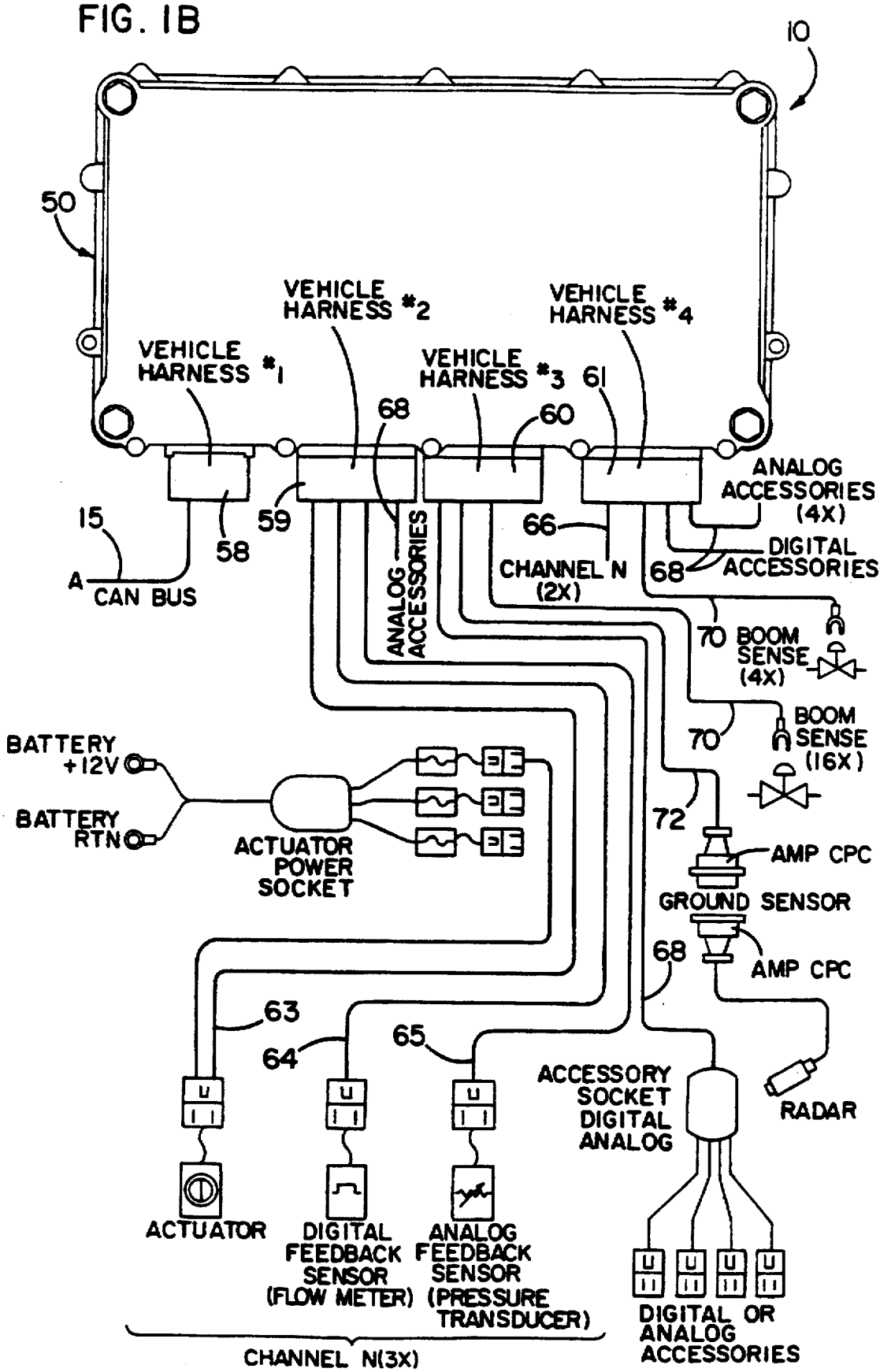

FIGS. 1A and 1B show generally a universal modular control system 10 constructed in accordance with the teachings of the instant invention. By connecting sensors and actuators associated with a material distribution apparatus 80 such as that depicted in FIG. 2 to the control system 10, and by inputting certain characteristics concerning the properties and operating characteristics of the material distribution apparatus 80, a user can employ the inventive control system 10 to monitor and control the operation of virtually any material distribution apparatus having substantially any application.

For example, when properly configured, the inventive control system 10 can be used to control the operation of farm implements such as liquid sprayers, anhydrous ammonia applicators, and granular distributors such as seed planters and fertilizer spreaders. When properly configured, it can also be used to monitor and control public works vehicles such as salt spreaders. In view of this flexibility, it will be appreciated that the inventive control system 10 is particularly useful to a user who employs multiple material distribution apparatus 80 at different times because a single control system can be used to control any of these apparatus.

To this end, the control system 10 is provided with two primary components, namely, a user console 20 and a control module 50. As explained in detail below, the control module 50 is the control center of the system 10. It monitors the operation of the serviced distribution apparatus 80; it generates control signals and communicates them to the distribution apparatus 80; and, it records information concerning the operation and performance of both the control system 10 and the serviced distribution apparatus 80. As also discussed in detail below, the user console 20 is primarily an input/output device that provides the user with visual information concerning the performance and operation of the control system 10 and the serviced distribution apparatus 80. It also provides a user-friendly means for inputting information into the control system 10. Together these components 20, 50 provide a universal control system 10 which is capable of controlling a wide variety of machinery.

Figure 2:
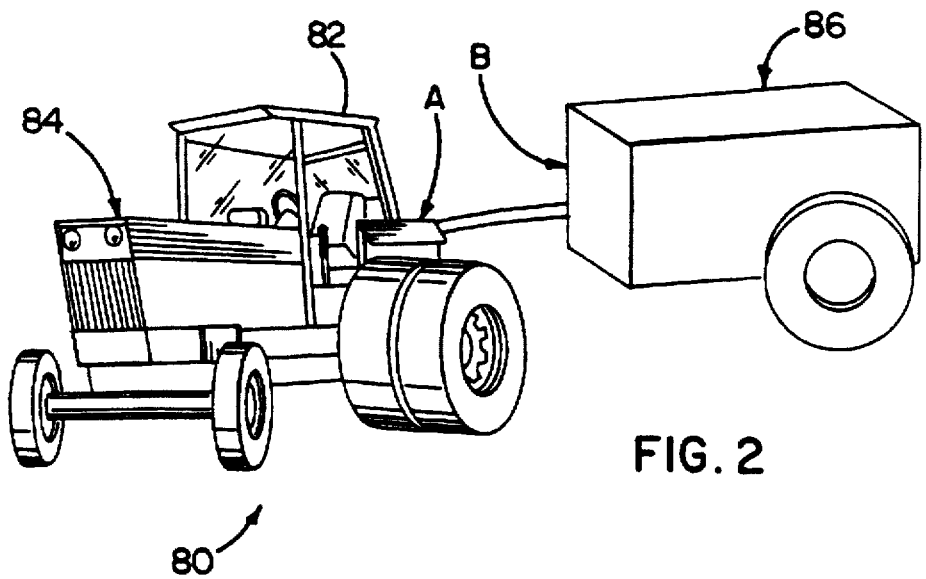
FIG. 2 is a perspective view of an exemplary mobile material distribution apparatus employing the control system of FIG. 1.

In order to minimize the amount of wiring present in the cab 82 of a material distribution apparatus 80 employing the control system 10, the inventive control system 10 is preferably constructed such that only the user console 20 need be disposed within the cab 82 (FIG. 2). The control module 50 which, as mentioned above, is the control center of the system 10, can be mounted exterior to the cab 82. Since, with a limited exception for speed monitoring explained below, the control module 50 is the only component of the system 10 that is directly connected to the sensors and actuators of the controlled material distribution apparatus 80, the vast majority of the wiring required for electrical communication can be located exterior to the cab 82 by positioning the control module outside of the cab 82. Again, since all of the calculations needed to control the serviced apparatus 80 are performed by the control module 50, only a single cable, namely, a serial bus such as, for example, a CAN ("Controller Area Network" per Bosch specification CAN 2.0) bus 15, is required to connect the control module 50 to the user console 20. As shown in FIG. 1A, the CAN bus 15 is, therefore, the only connecting cable that must enter the cab 82.

Those skilled in the art will appreciate that, notwithstanding the foregoing explanation of the advantages of mounting the control module 50 exterior to the cab, if a user so desires, the control module 50 may be positioned within the cab 82 without departing from the scope or the spirit of the invention. In addition, those skilled in the art will further appreciate that the disclosed universal control system 10 may be used with a cabless material distribution apparatus without departing from the scope of the invention.

As shown in FIG. 2, the material distribution apparatus 80 may comprise a tractor or prime mover 84 used to pull one or more distribution implements 86, or it can be constructed as a single structure (not shown). In the former case, the control module 50 can be disposed on the prime mover 84 (for instance, position A in FIG. 2), or it can be disposed on the pulled implement 86 itself (for example, position B in FIG. 2). To emphasize the universality of the inventive control system 10, the implement 86 has been shown as a non-descript block in FIG. 2. Those skilled in the art will appreciate that the non-descript block can be any distribution implement that a user wishes to control.

In any event, the CAN bus 15 is preferably provided with a connector 17 for selectively detaching the control module 50 from the user console 20. This ability to separate these two components 20, 50 is particularly advantageous when the control module 50 is secured on a detachable implement 86, (for example, near position B in FIG. 2), because it permits the user to detach the implement 86 from the prime mover 84 in order to use the prime mover 84 with a second implement. If the second implement 86 is also provided with a control module 50 (generally in the vicinity of position B in FIG. 2), simply connecting the control module 50 of the second implement 86 to the connector 17 of the CAN bus 15 will permit a user to utilize the control system 10 to monitor and control the second implement 86. Thus, if a user employs a single user console 20 and more than one control module 50, with each module 50 being mounted on a different implement 86, switching between implements will not require extensive wiring changes. Instead, it is only necessary to connect the appropriate control module 50 to the connector 17 of the CAN bus 15 and to mechanically secure the selected implement 86 to the prime mover 84.

Those skilled in the art will appreciate that a user can still switch between implements 86 with the inventive control system 10 even if only one control module 50 is employed. For example, if the control module 50 is mounted on the prime mover 84, a user can switch between detachable implements 86 by detaching all of the wiring associated with controlling the implement to be replaced from the control module 50, and attaching the wiring associated with the implement to be controlled to the control module 50 in its place. After identifying the new implement to the control system 10 via the user console 20, the control system 10 will be ready to monitor and operate the second implement.

Although both of the above approaches to interchanging implements are contemplated by the invention, the latter approach is disadvantaged with respect to the multiple control module scenario discussed above because it typically requires more wiring changes thereby introducing a greater possibility of wiring errors.

Although, as presently contemplated, a CAN bus is the preferred means for coupling the user console 20 and the control module 50, those skilled in the art will appreciate that other coupling means such as fiber optic cables or infrared links could be employed without departing from the scope or the spirit of the invention.

As mentioned above, the user console 20 is an input/output device that permits the user to communicate with the control system 10. To this end, the user console 20 is preferably provided with a display device 22, several input devices 24, and an annunciator 26 for producing audible information. In the preferred embodiment, the display device 22 comprises a liquid crystal display ("LCD"). However, those skilled in the art will appreciate that other display devices capable of providing the user with visual information concerning the operation of the control system 10 and the distribution apparatus 80 it services, such as CRT's and the like, could also be employed in this role without departing from the scope or the spirit of the invention. Those skilled in the art will further appreciate that, although in the preferred embodiment, the user console 20 includes a plurality of input devices 24, any number of such devices could be employed without departing from the scope of the invention.

In any event, in the preferred embodiment, the input devices comprise an alpha numeric keypad 28 for inputting data, a set of directional keys 29 for moving a cursor about the visual display 22 and incrementing/decrementing certain variables and turning specific channels on or off, an on-off power switch 31, a plurality of location keys 32 assigned to specific areas of the LCD 22 for selecting from one or more menus displayed on the LCD 22; a contrast switch 33 for controlling the contrast of the LCD 22; two special function keys 34; and three mode selection keys 35, 36, 37 whose functions are described below.

Figure 3:
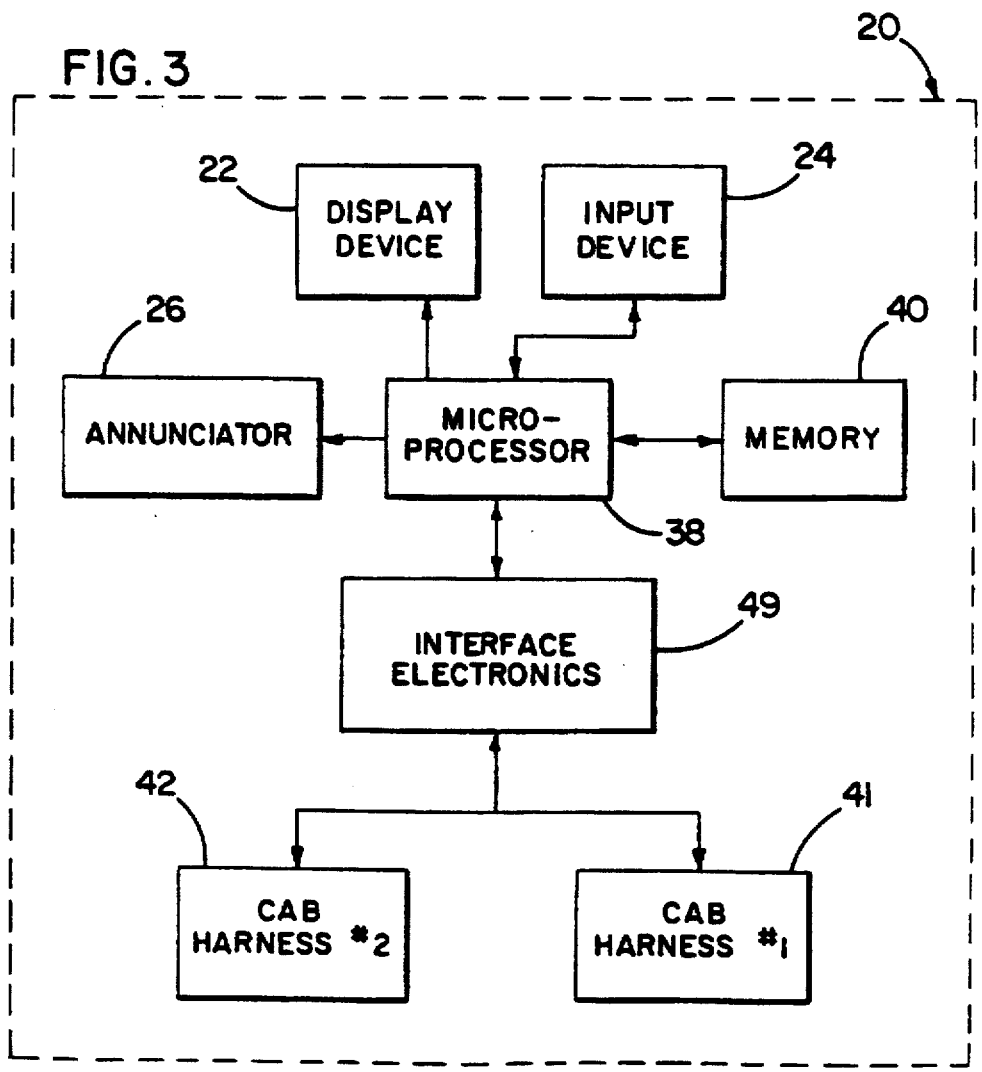
FIG. 3 is a schematic diagram illustrating the construction of the user console of the control system shown in FIG. 1A.

In order to process the information received through the input devices 24 as well as to drive the display device 22, the user console 20 is provided with a microprocessor 38. As shown in FIG. 3, the microprocessor 38 is provided with an associated memory 40. Preferably, the memory 40 is divided into a non-volatile memory such as a PROM for storing programmed instructions directing the operation of the microprocessor 38, and an addressable volatile memory for storing temporary data during operation. Any portion of the memory 40 can be implemented in a variety of ways, such as disks, tapes or other magnetic media, optical media, semiconductor memories, such as RAM, ROM, EPROM, flash memory, etc. Preferably, the program memory is flash memory, with suitable non-volatile memory used to store constants and other data. The programmed instructions contained in the memory 40 control the operation of the microprocessor 38; dictating the images and information which are displayed on the display device 22 and ascribing meanings to the various keystrokes made via the input devices 24.

The microprocessor 38 is coupled to various input and output ports which, for organizational purposes, are preferably grouped into two cab harnesses 41, 42. A first cab harness 41 is coupled to the CAN bus 15 which provides a communication link between the user console 20 and the control module 50. Cab harness 41 also includes power leads 43 for coupling the user console 20 to a power supply such as the battery of the prime mover 84. An ignition switch cable 44 is also provided to permit the control system 10 to be hard wired to the ignition system of the prime mover 84 such that the control system 10 automatically powers up and down whenever the prime mover 84 is turned on and off, respectively. The cab harness 41 is further provided with cable connectors 45 and 46 for optional connection to an external alarm and a master switch module 95, respectively. The external alarm could be employed, for example, to provide a visual alarm signal to a hearing impaired user or to a user operating in a noisy environment. The purpose of the master switch module 95 will be discussed in detail below.

The second cab harness 42 is provided with two cable connections 47, 48. A first one of these cable connections 47 can be optionally used to couple the user console 20 to a speed sensor such as a radar device. If this option is elected, however, it may be necessary to pass a second cable (in addition to the CAN bus 15) through the bulkhead of the cab 82 as shown in FIG. 1A. However, those skilled in the art will appreciate that in many instances a speed connection cable is made available in the cab by vehicle manufacturers thereby obviating the need for a user to add another cable to implement this option.

The second cable connection via cab harness 42 is an RS-232 port 48. This RS-232 port 48 is a general purpose, input/output cable that permits the user console 20 to communicate with any of a number of peripheral devices. For example, this port 48 can be coupled to a printer to permit the control system 10 to output information concerning the operation of the system 10 and/or the distribution apparatus 80 it controls. It can also be coupled to a computer (either a portable computer or a desktop through a modem) to perform remote control operation of the control system 10 and its serviced apparatus 80, to perform diagnostic procedures, and/or to download new or amended programmed instructions for use by the control system 10. As another example, the RS-232 port 48 could be employed to couple the control system 10 to a global positioning system to permit the control system 10 to interface with a system having maps recording data concerning the characteristics of the surface being serviced by the controlled distribution apparatus 80. Such access can be for the purpose of recording the distribution of material by the apparatus 80 or to provide the system 10 with variable setpoint information. For example, in one embodiment, the control system 10 is provided, via port 48, with site specific setpoint information from a GPS system, thereby permitting the control system 10 to control the distribution apparatus 80 such that precisely the amount of material required at each specific location in the field or area is distributed. As one skilled in the art would appreciate, port 48 could be used in other ways to provide the system 10 with remotely-provided control information. For example, a system for sampling the soil or other site-specific parameters can generate, in near real-time, a control signal, such as a setpoint signal, and can convey such a signal to the system 10 via port 48 to control and vary system operation as a function of such parameters.

Preferably, the settings of the RS-232 port can be selected by the user from a list of pre-defined, standard settings to enable the port to be used for communication with a wide variety of devices. The settings of the RS-232 port are set by microprocessor 38 of the user console 20 based upon the user's selections.

As shown in FIG. 1A, the second cab harness 42 is also preferably provided with a third cable connection for use in sensing the operable axle of a two axle vehicle.

As shown in FIG. 3, the cab harnesses 41, 42 are coupled to the microprocessor 38 via interface electronics 49. The interface electronics 49 include conventional power conditioning circuitry (not shown) to step the supply voltage from the tractor battery to a level appropriate for use by the control system 10. It also may include signal interface circuitry for converting the input and output signals to a format appropriate for use by the microprocessor and/or the peripherals. All of this interface circuitry is conventional and known to those skilled in the art.

Figure 4:
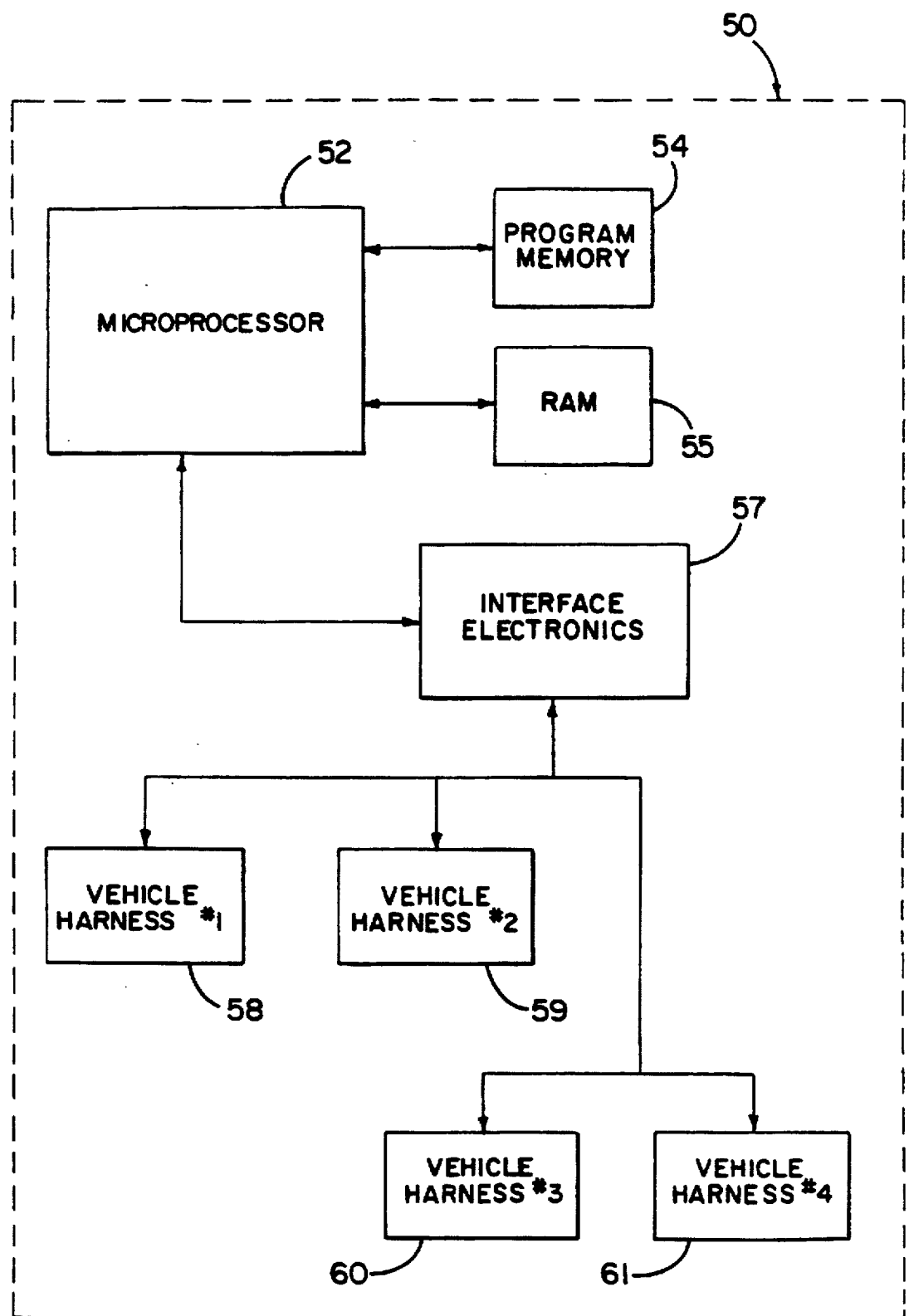
FIG. 4 is a schematic diagram illustrating the construction of the control module of the control system shown in FIG. 1B.

As mentioned above, the control module 50 is the command center of the control system 10. It is the control module 50 that couples to the material distribution apparatus 80 to monitor and control its performance. The heart of the control module 50 is a microprocessor 52. This microprocessor 52 is provided with programmed instructions stored in an associated program memory 54 as shown in FIG. 4. As explained in detail below, the programmed instructions permit the microprocessor 52 to monitor and control a plurality of feedback channels coupled to virtually any distribution apparatus 80 based on a variety of inputs including vehicle speed, setpoint as manually fixed or as specified by GPS, and other variables including the specific needs of a treated surface. They also permit the microprocessor 52 to monitor the control system 10 and the controlled distribution apparatus 80 for errors, and, to classify any such errors into categories or types to provide the user of the control system 10 with audible and visual indications of the nature of occurring errors. The microprocessor 52 is further programmed to monitor the status of a plurality of boom sections on a controlled boom in order to provide a user with a visual indication of which boom sections are "on" and which are "off"; as well as to provide a mapping system such as GPS with an accurate indication of what area of a surface was treated and with how much material. The microprocessor is also programmed to monitor the operation of any fence row nozzles disposed on a monitored boom in calculating the amount of material which must be supplied to that boom to achieve a desired material distribution, and to provide a mapping system such as GPS with information concerning the operation of the fence row nozzles to provide more accurate recording of the material distributed by the controlled apparatus 80 than was possible in prior art control systems.

As shown in FIG. 4, the microprocessor 52 is provided with an addressable random access memory 55 for storing data during operation. As those skilled in the art will appreciate, this memory 55 can be implemented in a variety of ways without departing from the scope of the invention. For example, it can be implemented by a hard disk drive, a floppy disk drive or memory chips depending upon the degree of volatility desired. Similarly, the ROM 54 can be implemented by any of a variety of well known devices including one or more EPROM chips, and/or a CD-ROM device. In the preferred embodiment, however, the ROM 54 is implemented by a FLASH and the RAM is implemented by a Static RAM. Non-volatile memory may be used for the storage of constants and other data.

As with the user console 20, the control module 50 includes a plurality of input and output ports which, for organizational purposes, are preferably grouped into four vehicle harnesses 58–61. As was the case with the user console 20 above, the microprocessor 52 of the control module 50 is coupled to these harnesses 58–61 via interface electronics 57. The interface electronics 57 of the control module 50 are implemented similarly to the interface electronics 49 of the user console. Thus, they include conventional analog to digital converters and digital to analog converters for converting the input and output signals transmitted to and from the microprocessor 52 into a format appropriate for use by the microprocessor 52 and/or the controlled apparatus 80. All of this interface circuitry is conventional and well known to those skilled in the art.

It will be appreciated by those skilled in the art that, although the reference numerals identifying the input/output ports of the harnesses 58–61 of the control module 50 and the harnesses 41, 42 of the user console 20 are connected via leadlines to cables for ease of discussion, the input/output ports that the reference numerals and the accompanying description actually refer to in this description are connectors that can be coupled to cables. They are not cables.

As shown in FIG. 1B, in the preferred embodiment vehicle harness 58 is coupled to the CAN bus 15 to provide a communication link between the control module 50 and the user console 20. As also shown in FIG. 1B, vehicle harness 59 is preferably coupled to three sets of input/output ports 63–65 coupled in "pairs" to form three separate feedback loops or channels. Specifically, each channel includes an output port 63 for coupling to an actuator, an input port 64 for coupling to a digital feedback sensor, and an analog port 65 for coupling to an analog feedback sensor. Usually all three of these ports 63, 64, 65, will not be used to form a feedback loop. On the contrary, in a typical arrangement the output port 63 of each loop will be coupled to an actuator on an implement to be controlled, with either the analog sensor port 65 or the digital sensor port 64 being coupled to a sensor on that same implement to form the other path for the feedback loop. The control module is unconcerned with which of these sensor inputs are employed, as long as one output port 63 and one input port (64 or 65) are connected in each of the channels.

Those skilled in the art will appreciate that the two sensor inputs 64, 65 are provided to permit the control system 10 to monitor and control implements regardless of whether analog or digital sensors are employed. Since substantially all actuators in the art are digital or pulse-width-modulated devices, only a digital output port 63 is provided for each channel. With this arrangement, virtually any implement can be controlled by the control system 10 as long as the system 10 is properly configured.

Those skilled in the art will further appreciate that, as used in this description and the appended claims, the term "pair" refers to any combination of an output port 63 and an input port (64 or 65) in a given channel used to form a feedback loop. Thus, a "pair" can be either output port 63 and digital input port 64, or output port 63 and analog input port 65. As those skilled in the art will further appreciate, although for simplicity of illustration, only one channel (i.e., one set of three output and input ports 63, 64, 65) are shown connected to harness 59, in the preferred embodiment three such channels (i.e., three sets of input/output ports) are in reality coupled to that harness.

In a preferred embodiment, two additional channels (generally referred to with reference numeral 66 in FIG. 1B) each including a set of ports comprising a digital output port 63, a digital input port 64, and an analog input port 65 similar to those discussed in connection with harness 59, are coupled to vehicle harness 61. Thus, in the illustrated embodiment, the control system 10 is capable of controlling five separate actuators via five separate feedback loops. Those skilled in the art will appreciate, however, that any number of feedback loops or channels can be provided without departing from the scope or the spirit of the invention.

In order to permit the control system 10 to monitor the operation of various accessories associated with the distribution apparatus 80 such as the fuel level of the tractor 84, the amount of material to be distributed remaining on the apparatus 80, the fan rpm of a controlled air boom, etc., the control module 50 is provided with a plurality of input ports 68. As shown in FIG. 1B, preferably some of these input ports are analog ports while the others are digital. As with the channels discussed above, dividing the accessory input ports 68 between digital and analog ports enables the control module 50 to monitor both digital and analog sensors thereby increasing the versatility of the control system 10. Although in the preferred embodiment, eight of these accessory input ports 68 are analog ports and six are digital ports, those skilled in the art will appreciate that any number of accessory ports 68 of any type (i.e., all digital, all analog, or mixed in any proportion) can be employed without departing from the scope of the invention.

In accordance with an important aspect of the invention, the control module 50 is further provided with a plurality of boom sense line inputs 70 for monitoring the operating state of a plurality of boom sections. More specifically, as explained above, a boom is an elongated structure having a plurality of nozzles/distribution ports disposed along its length for distributing material (typically liquid or granular material) over a surface. The boom sense line inputs 70 of the inventive control system 10 are employed to monitor the operation of these nozzles. Since a boom can be very long, sometimes as long as 100 feet in length, it can include many nozzles or distribution ports. These nozzles/distribution ports, however, are typically turned off and on in groups or boom sections. By associating one of the boom sense line inputs 70 with each of these sections, a user can employ the inventive control system 10 to accurately monitor the operation of these booms.

For example, if a boom has three sections, namely, two end sections and a middle section, and the operator only employs the end sections to distribute material, based on the signals from the boom sense line inputs 70, the control module 50 will recognize that the surface area beneath the middle section was not treated and, if the system 10 is coupled to a GPS system, will be able to accurately record that fact. In addition, the control module 50 will provide the user console 20 with this information such that the user console 20 can provide the user with a graphical representation of which boom sections are in use, and which are not. In the preferred embodiment, this ability to monitor boom sections can be employed with up to three monitored booms simultaneously.

Figure 15:
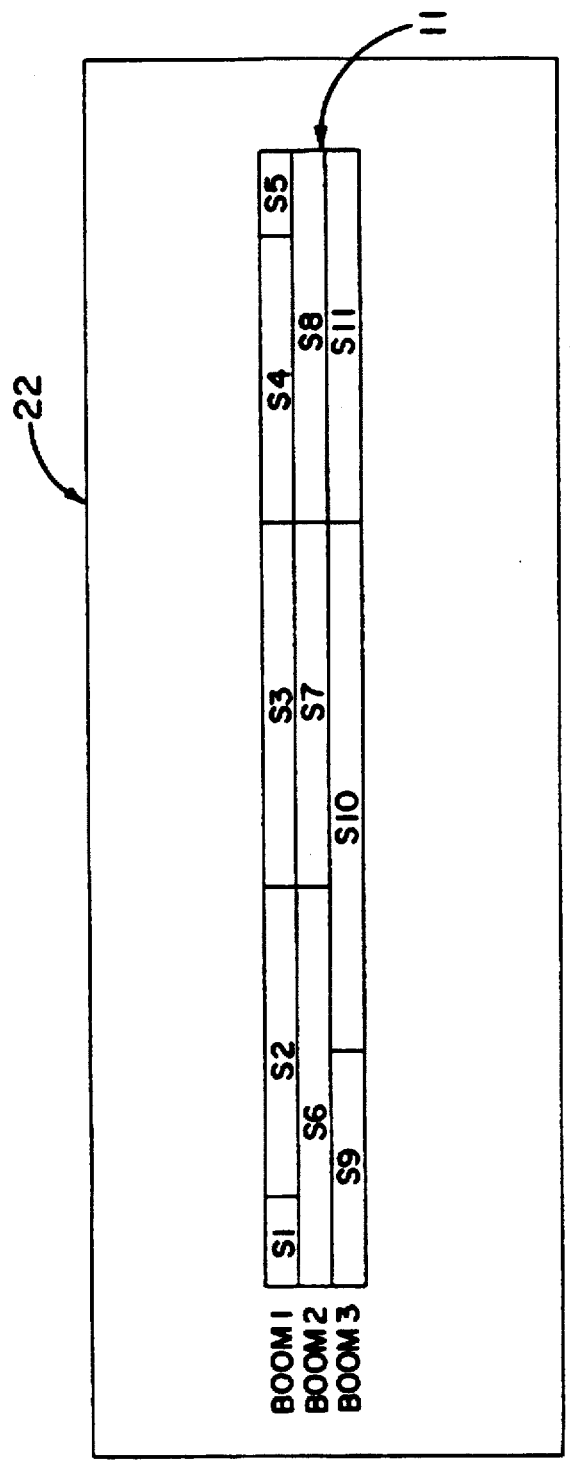
FIG. 15 is an illustration of an exemplary graphical representation of three booms monitored and controlled by the system of FIGS. 1A and 1B.

An exemplary graphical representation 11 of three monitored booms having twelve identified boom sections (S1–S11) displayed on the display device 22 of the user console 20 is illustrated in FIG. 15. Preferably, the size of the displayed boxes is representative of the size of the corresponding monitored section. For example, section S1 of boom one is smaller than section S2 thereby indicating that section S2 is a larger section of the boom than is section S1. Moreover, the graphical representation 11 will preferably identify which sections are on and which are off. In FIG. 15, all of the boom sections (S1–S11) in each of the booms are off. If one or more of those sections were on, the on sections would preferably be shown as a darkened block. For example, if boom two in FIG. 15 were the monitored boom in the above example of a three sectioned boom with its middle section off, sections S6 and S8 in FIG. 15 would be darker than section S7.

Those skilled in the art will appreciate that booms employed to dispense liquid materials employ nozzles to distribute material whereas booms employed to dispense granular materials employ distribution ports. As used in this application, the terms "nozzles" and "distribution ports" are used interchangeably with the understanding that a user would employ the appropriate apparatus type for the desired distribution activity. In other words, when used hereinafter in this description and the appended claims, the term "nozzle" shall include nozzles used for distributing liquid materials as well as distribution ports used to distribute granular materials.

In accordance with another aspect of the invention, the boom sense line inputs 70 can be used to monitor the operation of fence row nozzles disposed on the controlled boom. Due to the unique characteristics discussed above, each fence row nozzle is preferably treated as a boom section onto itself. Thus, in FIG. 15, section S1 could represent a single fence row nozzle. If a user specifies the operating characteristics of this and the other nozzles of the boom, the control module 50 will employ well known equations to calculate an appropriate setpoint indicative of the amount of material that should be supplied to a controlled boom to achieve a desired distribution rate across the non-fence row nozzles. These calculations will take the effects of the operating state of the fence row nozzle(s) into account in determining this rate.

For clarity, it should be noted that the boom sense line inputs 70 are not control channels. They are merely inputs for monitoring the operation of the serviced booms. It should further be noted that, although in the illustrated embodiment, 20 boom sense line inputs 70 are provided, any number of such inputs 70 could be employed without departing from the scope of the invention. Those skilled in the art will appreciate that the boom sense line inputs 70 can be used to monitor the operation of implements that are not truly "booms" in the traditional sense of an elongated tubular structure with a plurality of nozzles disposed along its length. For example, the inventive control system 10 can be used to monitor the operating state of a spreader for granular materials. In such an instance, if the spreader is appropriately coupled to one or more of the boom sense line inputs 70, the control system 10 will generate a graphical representation of the spreader just as if it were a "boom" in the sense discussed above. For example, if a spreader having two spinners were attached to the system 10 and appropriately identified via the user console 20 by the user, it could appear as a line similar to boom 3 in FIG. 15 but including only two sections such as S10 and S11, each corresponding to the distribution width of one of the two spinners of the spreader.

As mentioned above, the user console 20 includes an input 47 for use with a speed sensor such as a radar device. However, coupling a speed sensor to the user console 20 requires the presence of a second cable in the cab 82. In order to avoid cluttering the cab 82 with such a cable, the control module is also provided with an input 72 for a speed sensor. Thus, depending upon the user's preference, a speed sensor can be coupled to either the control module 50 or the user console 20 without departing from the scope of the invention.

As mentioned above, in the preferred embodiment, the user console 20 is coupled to a master switch module 95. The master switch module 95 is preferably an independent structure that can be mounted anywhere within easy reach of the vehicle operator, but it may be mounted within the housing of the user console 20. The switch module 95 is a three position switch, but its function may be implemented with multiple switches if desired. In a first position referred to as the "auto" position, the switch module 95 provides the control system 10 with a signal indicating that the system 10 should enter the "Auto" mode. In a second position, the switch module 95 provides a control signal which informs the control system 10 that it should enter the "Off" mode. In a third position, the switch module 95 provides a signal that causes the system 10 to enter the "Manual" mode. Each of these modes will be explained in turn.

The "Auto" mode is the mode of operation the system 10 should be placed in during automatic operation. In this mode, the control module 50 will monitor and control any apparatus 80 coupled to the channels, based on the variables the user has selected (optionally including a GPS-determined setpoint input). It will also monitor the operation of any connected accessories and any connected implement sections such as boom sections or spinners. The control module 50 will provide the user console 20 with information concerning these activities, which will in turn display the monitored readings on the display device 22 for the user's consideration. Although the user cannot change system configuration and most variables in the "Auto" mode, the user can turn channels on and off and manually increment and decrement set points "on the fly" via the directional keypad 29 in this mode. The user can interrupt the "Auto" mode by flipping the master switch module 95 away from the "Auto" position.

When the master switch module 95 is flipped to the "Off" position, the input devices 24 are monitored by the control system 10 for data input by the user. Specifically, by stepping through various user friendly menus and entering appropriate data, a user can identify the characteristics of the controlled distribution apparatus 80; can specify desired application rates and other desired operating characteristics; can perform diagnostic procedures; can print out formal reports; and perform other desirable housekeeping and configuration procedures. When the master switch module 95 is in the "off" position, the control module 50 may continue to monitor accessory inputs and cause any appropriate display on the user console 20.

Finally, when the master switch module 95 is switched to the "Manual" mode, the control system 10 will use predefined default values as its input in order to open all of the actuators of the attached implement a predefined amount. This mode is useful, for example, in dumping or otherwise flushing the controlled distribution apparatus 80. To avoid inadvertent dumping of excessive amounts of material, the "Manual" position is preferably a momentary contact position of the master switch module 95 such that a user must intentionally hold the master switch 95 in the Manual position or the switch 95 will automatically bounce out of that position.

It should be noted that in the preferred embodiments, rather than continuously providing the other components of the control system 10 with an indication of its state, the state of the master switch module 95 is periodically polled by the user console 20 which, in turn, transmits data indicative of its position to the rest of the system 10 when it changes state.

The operation of the inventive control system 10 will now be explained in connection with the flowcharts illustrated in FIGS. 5–14. Those skilled in the art will appreciate that, although the flowcharts illustrate the programmed instructions performed by the microprocessors 38, 52 of the user console 20 and the control module 50, those programmed instructions can be implemented in many different ways without departing from the scope or the spirit of the invention. Also, though best described and illustrated with flowcharts, one skilled in the art will appreciate that the actual implementation need not be strictly sequential as suggested by the flowcharts. For example, the various routines described may run independently, sharing processor resources in a time-divided manner.

Figure 5A:
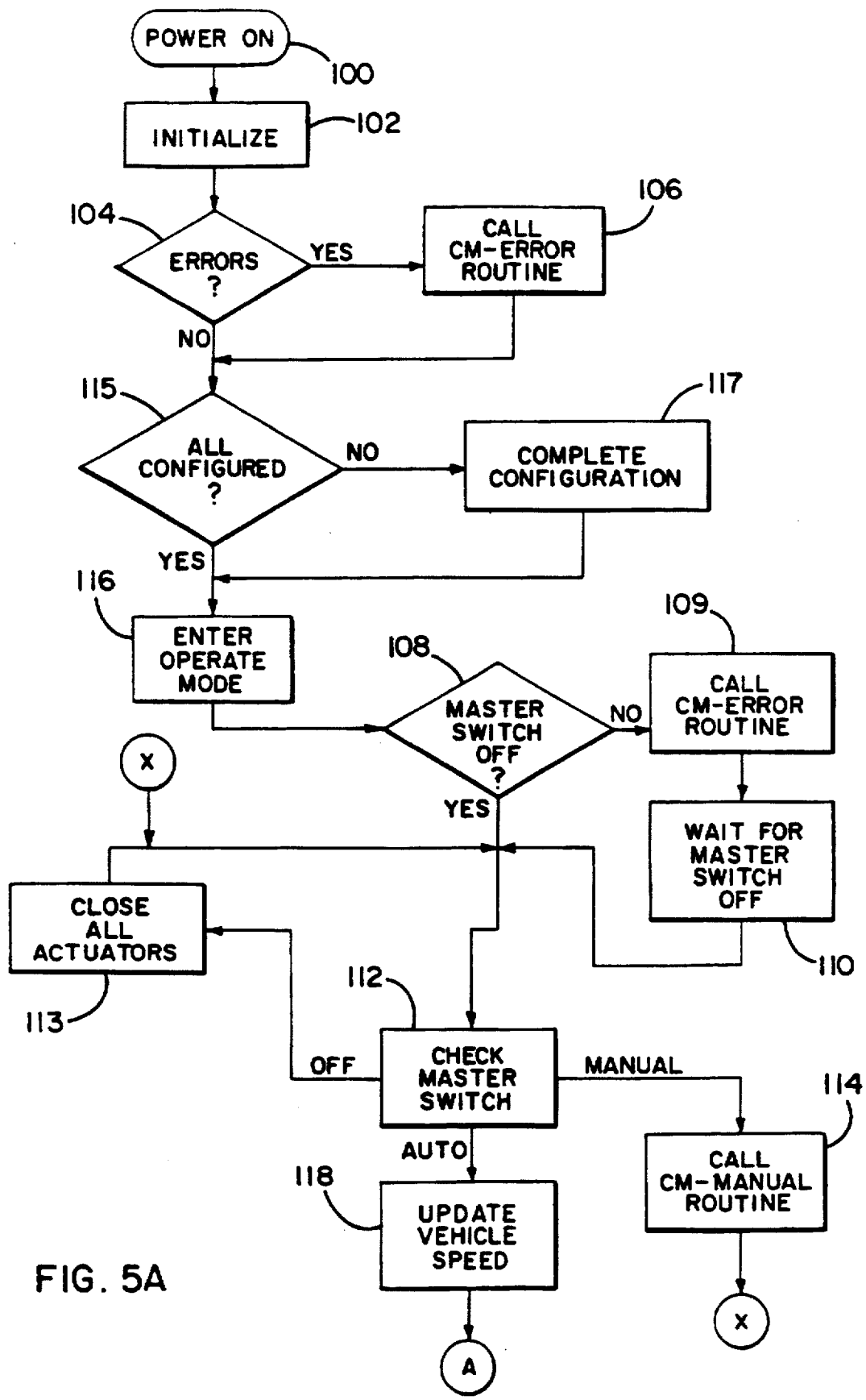
FIGS. 5A–5C comprise a flowchart illustrating the operation of the control module of the control system illustrated in FIG. 1B.

Turning first to FIG. 5A, after power is applied to the system 10 at block 100 either through starting the tractor, if input 44 of the user terminal 20 is hard wired to the ignition (FIG. 1A), or by flipping power switch 31 (FIG. 1A), the microprocessor 52 of the control module 50 undergoes certain initializing procedures (block 102). These procedures preferably include self-testing procedures such as memory tests, but also includes various housekeeping functions such as closing all valves and reading constants from Non-Volatile Memory. If errors are detected (block 104), microprocessor 52 immediately calls the CM-ERROR routine illustrated in FIG. 6 (Block 106).

The CM-ERROR routine is a means for classifying errors. The process begins at step 160 where the microprocessor 52 determines whether the noted error is a Type 1 error. Type 1 errors include loss of CAN communication and Bad Master Switch errors. If it is determined that the detected error is a Type 1 error, the microprocessor 52 sends information identifying the error to the user console 20 over the CAN bus 15 (block 162) and immediately closes all of the actuators connected to the channels or feedback loops to ensure unwanted discharge does not occur (block 164). Having determined the error type, the microprocessor 52 will advance to step 378. In accordance with an important aspect of the invention, the control system 10 keeps a running list of the errors that the control system has noted. This list can be downloaded at any time via the RS-232 port 48 to a printer, or to a computer (connected either via a modem or attached directly to the RS-232 port), to provide the user with an opportunity to analyze the errors that have occurred. Preferably, the error list can also be displayed on the LCD 22 of the user console 20.

The ability to download this list via the RS-232 port 48, enables a technician to analyze and diagnose problems with the control system 10 and/or the monitored distribution apparatus 80 from a remote location. Thus, if a user of the control system 10 encounters a series of errors, rather than requiring a technician to travel to the control system 10 or the user to ship the control system to the technician, the technician can simply connect to the user's control system 10 via the RS-232 port 48 to review the error list, perform diagnostic tests, and in some instances, download programmed instructions to the control system 10.

Figure 6:
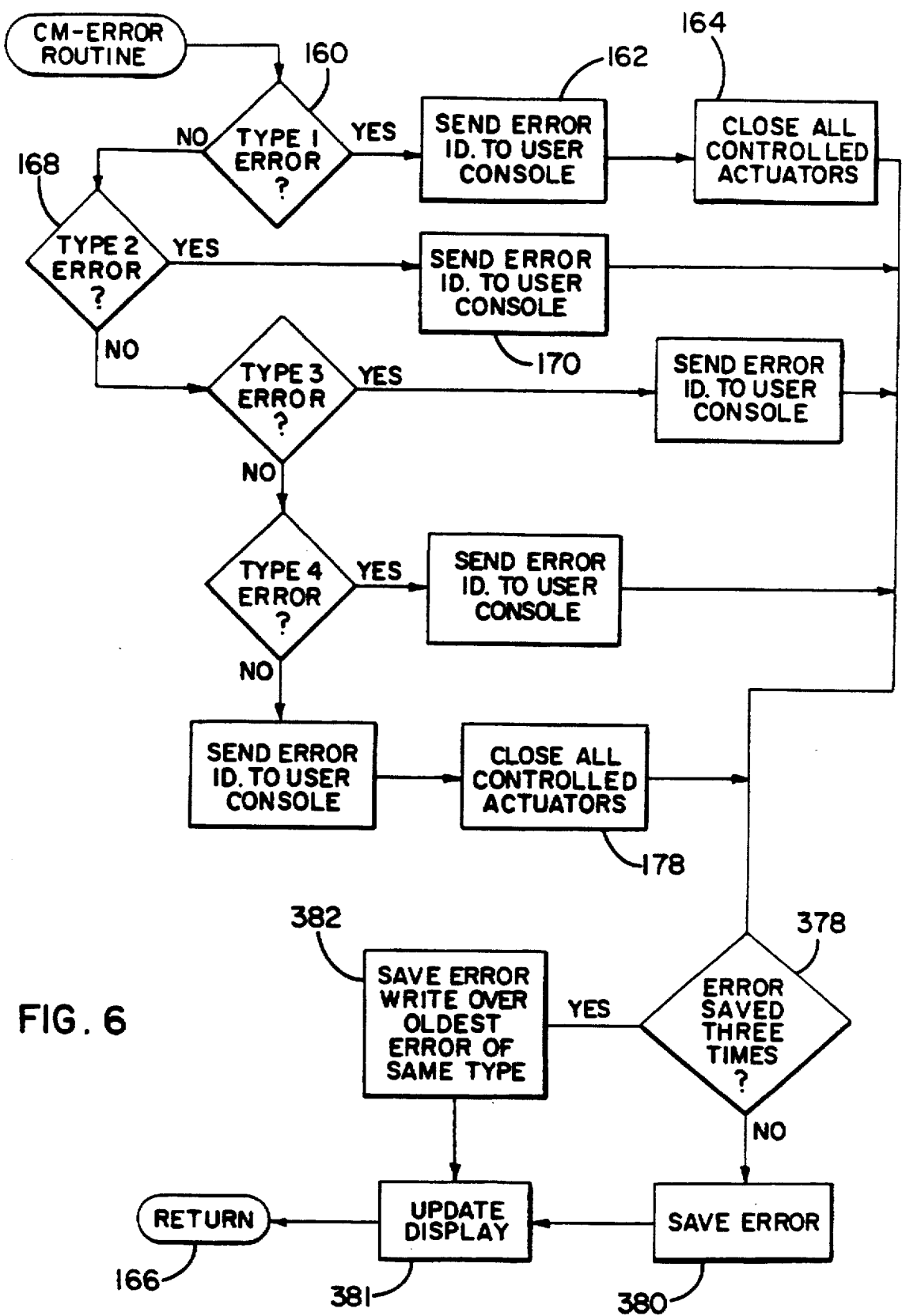
FIG. 6 is a flowchart illustrating the CM-ERROR routine called in the flowchart of FIGS. 5A–5C.

In order to maintain the error list within a manageable level, the microprocessor 52 will preferably only store the last 30 errors. Moreover, in the preferred embodiment, only the three most recent occurrences of an error will be recorded. Thus, as shown in FIG. 6, at step 378 the microprocessor 52 will first determine whether the error in question has been saved three times on the error list. If it has not, the microprocessor 52 will advance to step 380 where the error will be added to the list. If, on the other hand, the error already appears on the list three times, the microprocessor will advance to step 382 where it will amend the error list by adding the most recent occurrence of the error and deleting the oldest occurrence of that same error. Those skilled in the art will appreciate that, due to this method of managing the error list, the error list is preferably kept in chronological order, and preferably includes the date and time at which the error was noted as well as a description of the error and a suggested solution. Those skilled in the art will further appreciate, that the error list could optionally include information concerning the operating state of the control system 10 and/or the controlled distribution apparatus 80 at the time the error occurred. For example, the error list could include such information as the vehicle speed, the Operating mode (i.e., Auto mode, Off mode, Manual mode, Operate state, Setup state, System state), and other information that could be useful in diagnosing problems with the system.

In any event, after saving the most recent error to the error list at either step 380 or step 382, the microprocessor 52, having determined the error type and saved the error information, will then update the display in accordance with the error (step 381) and exit the CM-ERROR routine (block 166).

If the error is not of the Type 1 category, the microprocessor 52 will decide whether the presented error is a Type 2 error (block 168). Again, if the error is identified as a Type 2 error, the error identification information is sent to the user console 20 to notify the user (block 170). However, Type 2 errors which include events such as APER, Control not Responding, and Use of Unconfigured Section, are not sufficiently worrisome to merit closing all of the controlled actuators. Consequently, after identifying the error as a Type 2 error, the microprocessor 52 will proceed through steps 378–382 as described above and exit the CM-ERROR routine without closing any actuators.

If the error is neither a Type 1 error nor a Type 2 error, the microprocessor 52 will continue to cycle down through the error types seriatim as shown in FIG. 6. Thus, the microprocessor 52 will first consider whether the presented error is a Type 3 error. If it is not, it will then consider whether it is a Type 4 error and so on until either the microprocessor 52 identifies the error as a Type 3, 4 or 5 error.

Figure 5B:
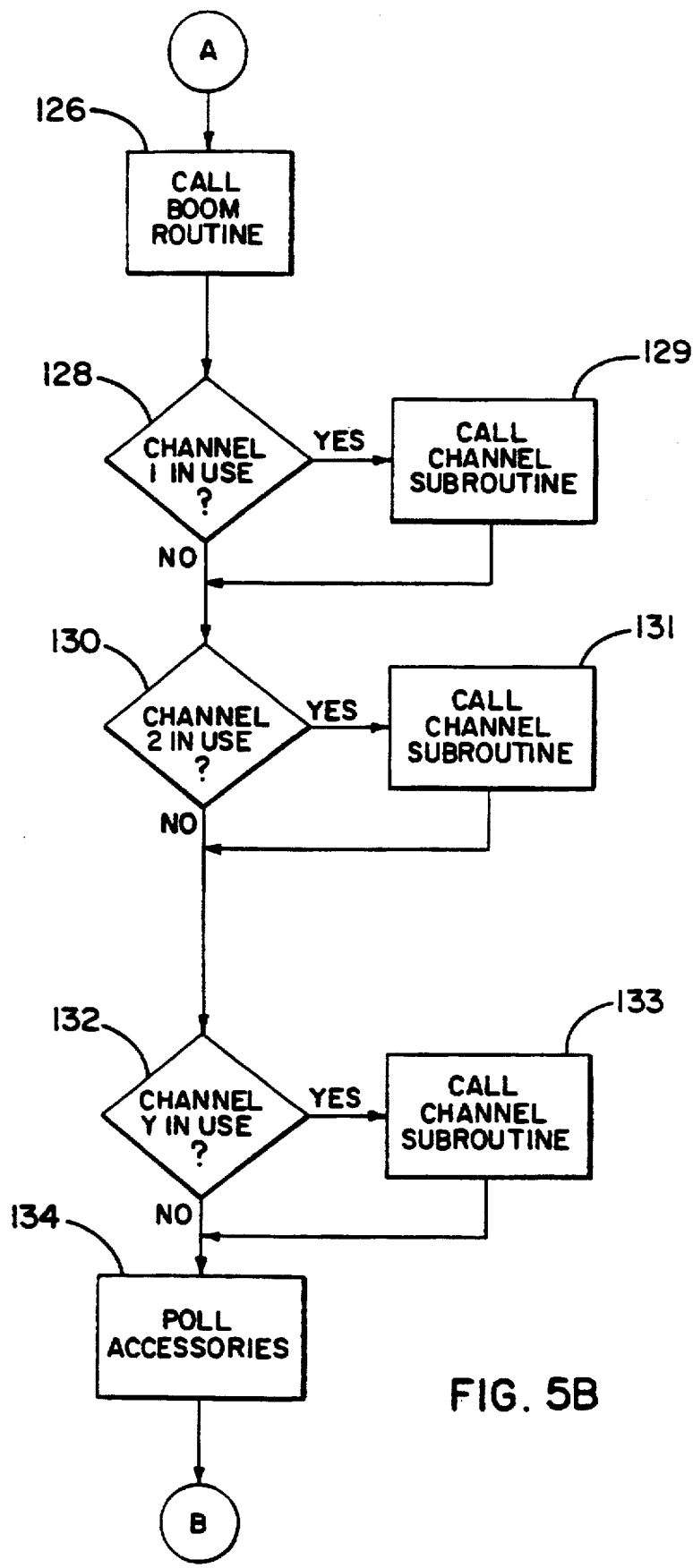
Figure 5C:
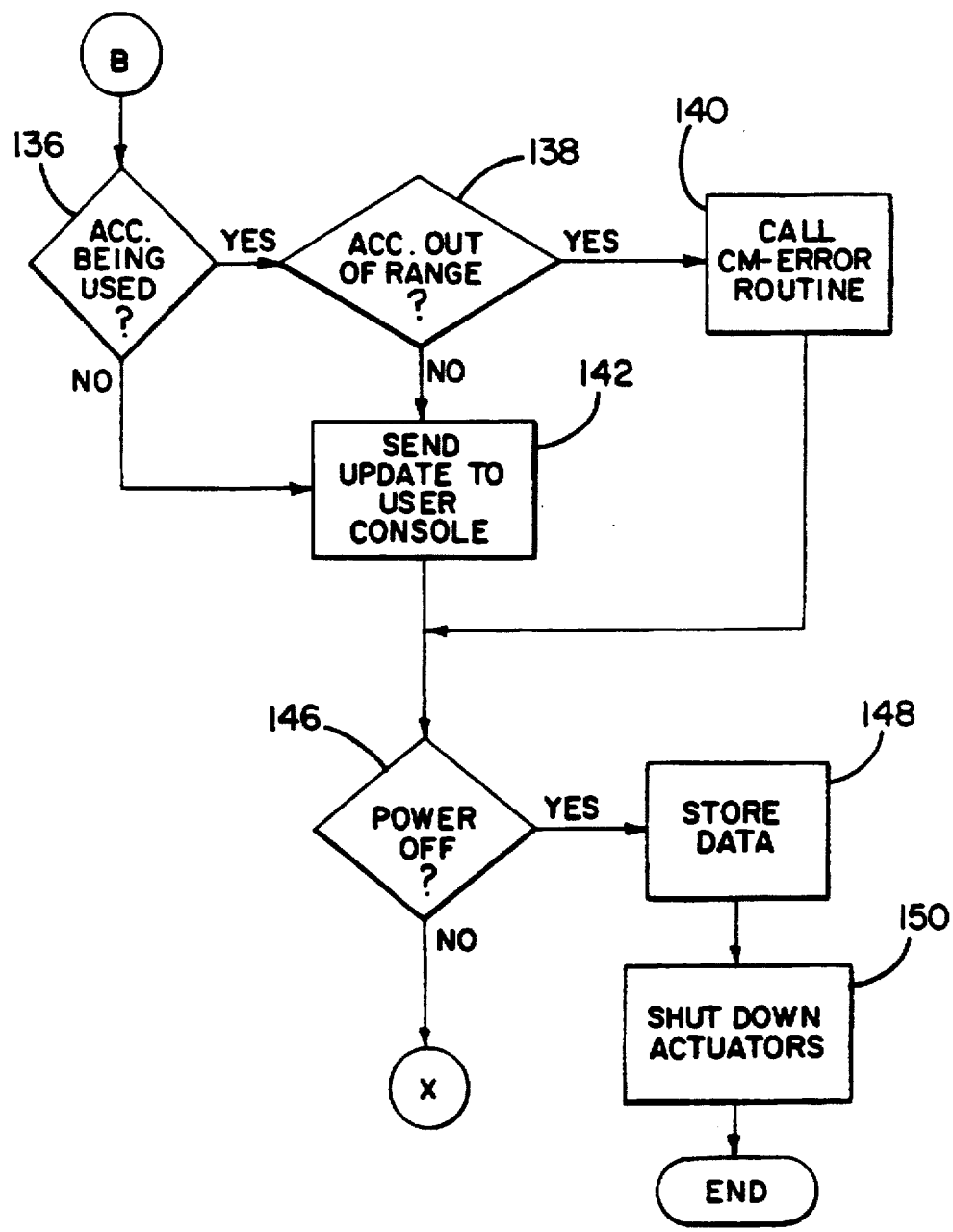

Type 3 and Type 4 errors which respectively include Pressure out of Range, Remote Control Communication Lost, and Accessory Alarm (Type 3); and Ground Speed Override mode entered, and Invalid Entry (Type 4); do not require the closing of the controlled actuators but, instead permit continued operation. Those skilled in the art will further appreciate that Type 5 errors, which include no ground speed for an extended time and entering operate mode with master switch not off, are serious enough to require the closing of all controlled actuators (block 178) before saving the error information and returning to the main control module loop (FIGS. 5A–5C). In any event, after the error is classified and saved, the microprocessor 52 exits the CM-ERROR routine returning to the position in the main control module loop (FIGS. 5A–5C) where it left off.

Turning back to FIG. 5A, assuming no errors were noted at step 104, or the noted errors were determined to not require termination (block 106), the microprocessor 52 advances to step 115. In step 115, the microprocessor 52 will check to be sure that all necessary configuration information has been set. If not, the user will be required to complete to configuration (step 117). This is accomplished in the OFF mode. As a result, the system 10 cannot run unless the user has completed the configuration.

Once the system 10 is completely configured, the microprocessor 52 enters the Operate mode (block 116) and checks to see what mode the master switch module 95 is in (block 112). The master switch 95 must initially be in the Off position, as is determined at step 108. If the master switch 95 is not off, then the CM-ERROR routine will be called (at step 109), and, at step 110, the system 10 will wait for the master switch 95 to be placed in the OFF position. Once the master switch 95 is in the OFF position, all actuators will be closed (step 113), and the system 10 will stand by for a transition of the master switch 95 to another position.

Figure 7:
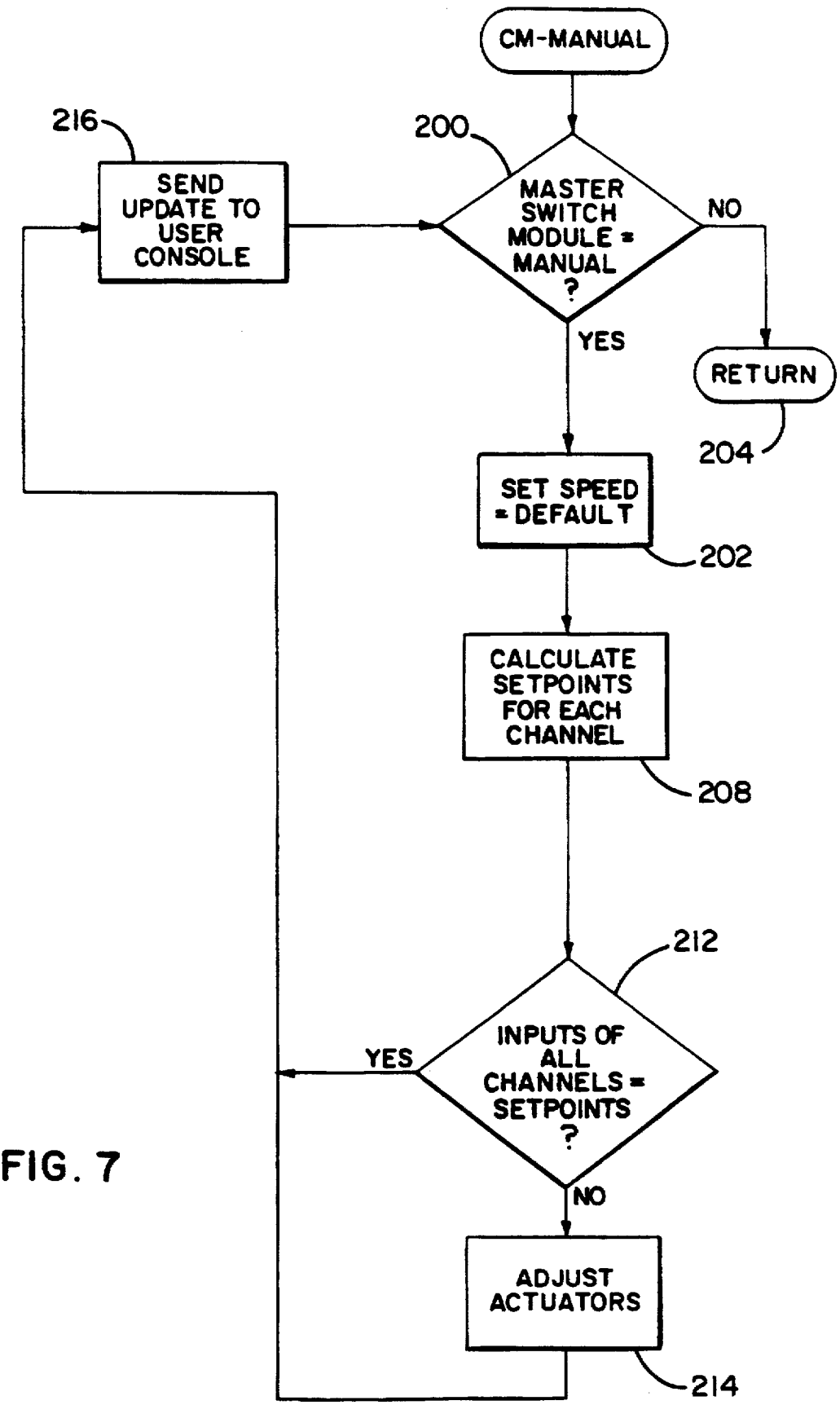
FIG. 7 is a flowchart illustrating the CM-MANUAL routine called in the flowchart of FIGS. 5A–5C.

If the switch module 95 is transitioned to the Manual position, the microprocessor 52 advances to step 114 and calls the CM-MANUAL routine shown in FIG. 7. Turning to that figure, if a verification (block 200) again indicates that switch 95 is in the Manual mode, the microprocessor 52 advances to step 202 where it ignores the current actual ground speed of the prime mover 84, and sets the speed reading to a default value stored in memory. If, on the other hand, it is determined that the master switch module 95 is not in the Manual position, the CM-MANUAL routine is exited at step 204 and the microprocessor returns to its main routine (FIGS. 5A–5C).

Assuming the master switch 95 is set at the Manual position and the speed variable has been set to the default value (step 202), the microprocessor 52 then calculates a new setpoint for each channel (step 208). The microprocessor 52 advances to step 212 where it compares the sensor inputs of each of the channels to its respective newly calculated setpoint. If any of the actuators are at a different position than its calculated setpoint, the microprocessor 52 sends a corrective signal to the actuator to bring it into line (step 214). It then updates the user console 20 via the CAN bus 15 with any monitored information that has been changed (block 216). For example, if the material levels are being monitored via an accessory input port 68, the microprocessor 52 will update the user console 20 with respect to any changes in those levels. Similarly, the newly calculated setpoint information (i.e., flow rates and the like) will be forwarded to the user console 20 for display to the user.

If, at step 212, it is determined that all of the actuators are at their respective setpoints, the microprocessor skips step 214 and enters step 216 (updating user console 20) directly. In any event, after the user console 20 has been updated, the microprocessor 52 checks to see if the master switch module 95 is still in the Manual mode (step 200). If it is, the above process is repeated until the master switch 95 is removed from the Manual position. Those skilled in the art will appreciate that if the default values of step 202 are properly chosen, the Manual mode will be useful for quickly dumping all of the materials from the controlled implements for storage, flushing, or the like as well as for initial charging of the plumbing.

In any event, upon leaving the CM-MANUAL routine, the microprocessor 52 returns to step 112 in FIG. 5A, (assuming no errors have been identified by the user console 20), where it determines the position of the master switch 95.

Figure 8:
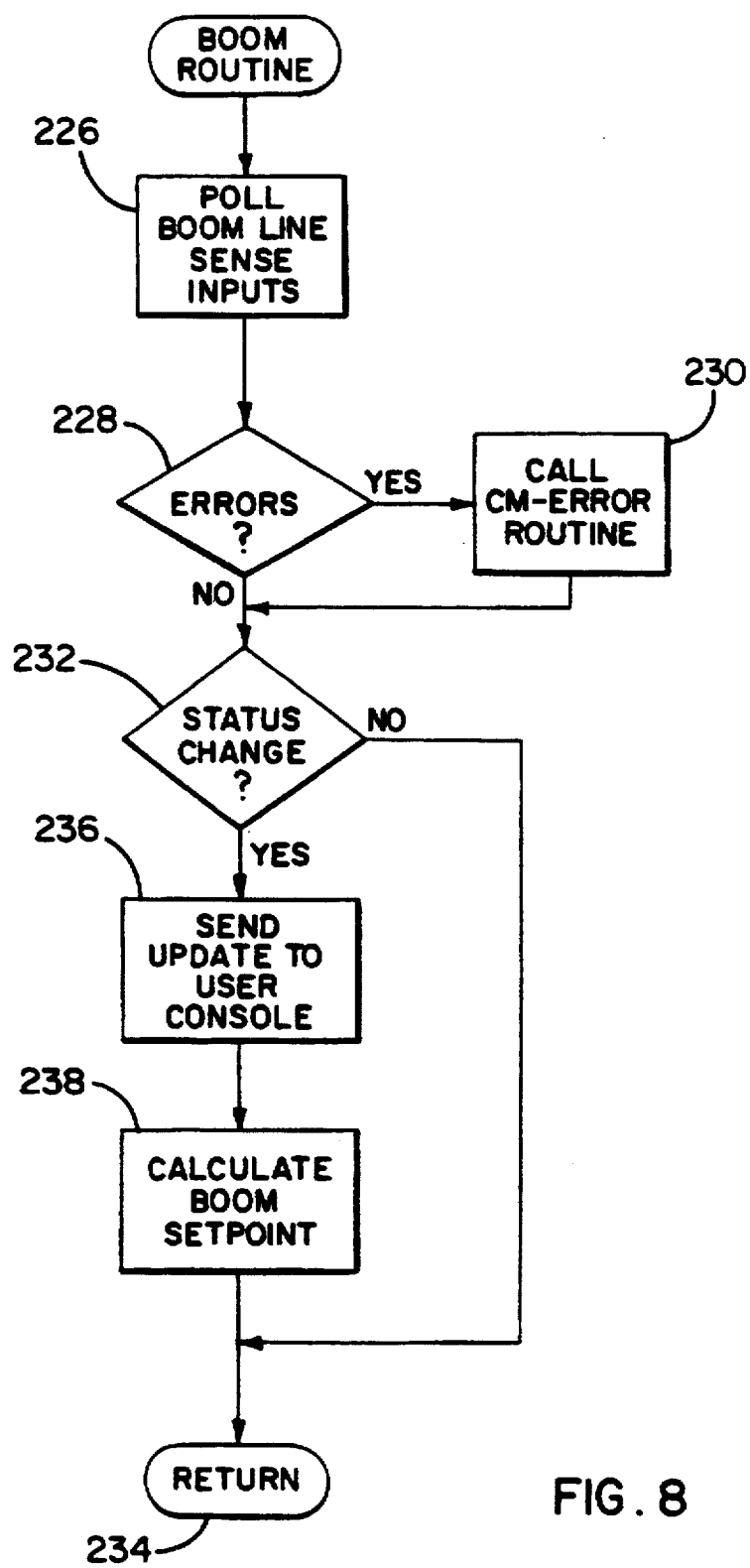
FIG. 8 is a flowchart illustrating the BOOM routine called in the flowchart of FIGS. 5A–5C.

If the master switch 95 is in the Auto mode, the microprocessor 52 will advance to step 118 where it will read the current actual ground speed of the prime mover 84. Next, the microprocessor calls the BOOM routine illustrated in FIG. 8 at step 126. As shown in FIG. 8, the microprocessor 52 begins the BOOM routine by polling the boom line sense inputs 70 (step 226). After reading the inputs 70, the microprocessor checks for errors (block 228). If errors are detected, the microprocessor calls the CM-ERROR routine discussed above (block 230). Otherwise, the microprocessor 52 advances to step 232 where the microprocessor 52 determines if there has been a status change (i.e., switched from "on" to "off" or vice versa) with respect to any of the monitored boom sections.

If no status change has occurred, the microprocessor 52 exits the BOOM routine (step 234). Otherwise, it sends information identifying the status change to the user console 20 at step 236. After updating the user console 20, the microprocessor 52 employs the new boom section status information to calculate a new setpoint for each controlled boom that has experienced a status change (step 238). This calculation, made in accordance with algorithms known in the art, permits the microprocessor 52 to vary the amount of material delivered to the controlled booms depending upon how many nozzles are open or closed. This calculation will take into account any change in status of any monitored fence row nozzles on the controlled booms and will vary the amount of material accordingly.

After completing the boom setpoint calculations (step 238), the microprocessor 52 exits the BOOM routine. Upon returning to the main control module loop, the microprocessor will determine which of the channels of the control module 50 are coupled to an implement in steps 128, 130, and 132. For each channel in use, the microprocessor 52 will call the CHANNEL subroutine (steps 129, 131 and 133). Those skilled in the art will appreciate that the process of checking if a channel is being used and, if so, calling the CHANNEL subroutine will be repeated Y times, where Y equals the maximum number of channels the control module 50 is capable of controlling. In one preferred embodiment, the maximum number of channels is three (Y=3). In other preferred embodiments, maximums of one (Y=1) and five channels (Y=5) are respectively controlled. However, those skilled in the art will appreciate that any number of channels can be provided without departing from the scope of the invention.

Figure 9:
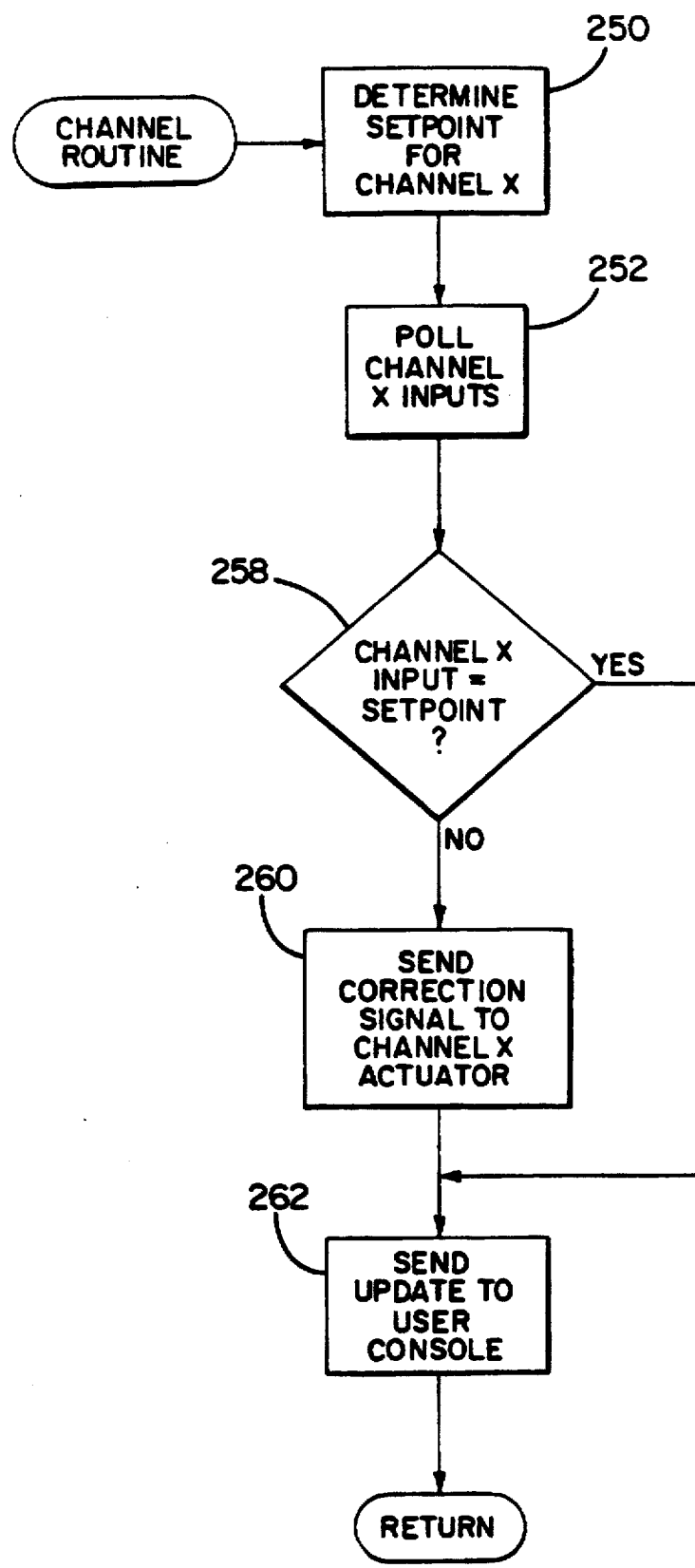
FIG. 9 comprises a flowchart illustrating the CHANNEL routine called in the flowchart of FIGS. 5A–5C.

If the microprocessor 52 determines in steps 128, 130 or 132 that a channel is in use, it calls the CHANNEL subroutine illustrated in FIG. 9. The microprocessor 52 begins the CHANNEL subroutine by calculating the setpoint for the channel in question (step 250). This calculation can be based on any inputs provided by the user. In one preferred embodiment, this calculation is based upon the actual ground speed of the prime mover 84, the desired material levels of a given surface, and the actual material level at each location as indicated in a predetermined material map read in conjunction with a GPS input. In another preferred embodiment, the setpoint is determined based upon the output of another channel of the control module 50. In other words, the output of one channel can be used as an input to a second channel to make the operation of the second channel dependent upon the first channel.

In any event, after the microprocessor 52 determines the setpoint for the channel in question (i.e., channel X, where X≦Y), the microprocessor 52 polls the input port (64 or 65) for that channel to obtain input or feedback information. (step 252). Armed with this information, the microprocessor 52 proceeds to step 258 where the measured input signal from the channel input port (64 or 65) is compared to the calculated setpoint. If a difference is detected, the microprocessor 52 sends a correction signal to the actuator of channel X via the output port 63 of that particular channel (step 260). If no correction signal is warranted, the microprocessor 52 skips step 260 and advances to step 262. In that step, the microprocessor updates the user console 20 with respect to the current operating characteristics of the channel in question. Those characteristics preferably include the current distribution rate. After updating the user console 20, the microprocessor 52 exits the CHANNEL routine.

In the preferred embodiment, the correction signal sent by the microprocessor 52 (step 260) is preferably representative of both the measured differences between the input signal and the calculated setpoint, and of the operating characteristics of the controlled actuator. In accordance with an important aspect of the invention, the operating characteristics of the actuators are automatically determined by the control system 10. Specifically, the control system 10 determines the channel boost (i.e., how fast the controlled actuator opens to a desired level) by completely opening the actuator and measuring the time it takes for the actuator to go from the completely closed to the completely open state. The system 10 then determines channel response (i.e., the amount of oscillation the actuator experiences around the setpoint) by incrementally opening the actuator in pre-defined steps and building a relationship between the signal sent to increment the actuator and the measured feedback signal. This relationship can optionally be graphed. Based upon these determinations, the control system 10 selects an optimum gain for the channel in question. This gain is representative of the operating characteristics of the controlled actuator.

Those skilled in the art will appreciate that the CHANNEL routine is called and performed for each controlled channel. After the CHANNEL routine is completed for the last channel, the microprocessor 52 advances to step 134 in FIG. 5B where it polls the input ports 68 which are assigned to accessory monitoring. If after reading the input ports 68, the microprocessor 52 determines that an accessory is being monitored (step 136), the microprocessor 52 then verifies that the accessory readings for each of the monitored accessories are within an acceptable range indicating that the monitored accessories are operating in a desired fashion (step 138). If the accessory readings fall outside of the predetermined range, the microprocessor 52 calls the CM-ERROR routine (step 140). Otherwise, the microprocessor 52 updates the user console 20 by sending the monitored information concerning the operation of the accessories over the CAN bus 15 (step 142).

If, back at step 136, the microprocessor determines that no accessories are being used, it proceeds to step 142 where the user console 20 is again updated via the CAN bus 15.

Regardless of the path taken from step 136, the microprocessor 52 will eventually arrive at step 146 where it checks for a power turn-off message from the user console 20. If a power turn-off message is detected, the microprocessor 52 will store all necessary data in its memory (step 148) and shut down all of the controlled actuators (step 150). If no power turn-off message is detected at step 146, the microprocessor 52 returns to block 112 in FIG. 5A where it again checks the mode of the Master Switch 95. If the Master Switch is still in Auto mode, the microprocessor continues to cycle through the main control module loop.

If instead of determining that the master switch module 95 is in the Auto mode or the Manual mode at step 112 on FIG. 5A, the microprocessor determines that the master switch 95 is in the Off mode, it will close all actuators (block 113) and wait for a state change in the Master Switch 95.

Figure 10A:
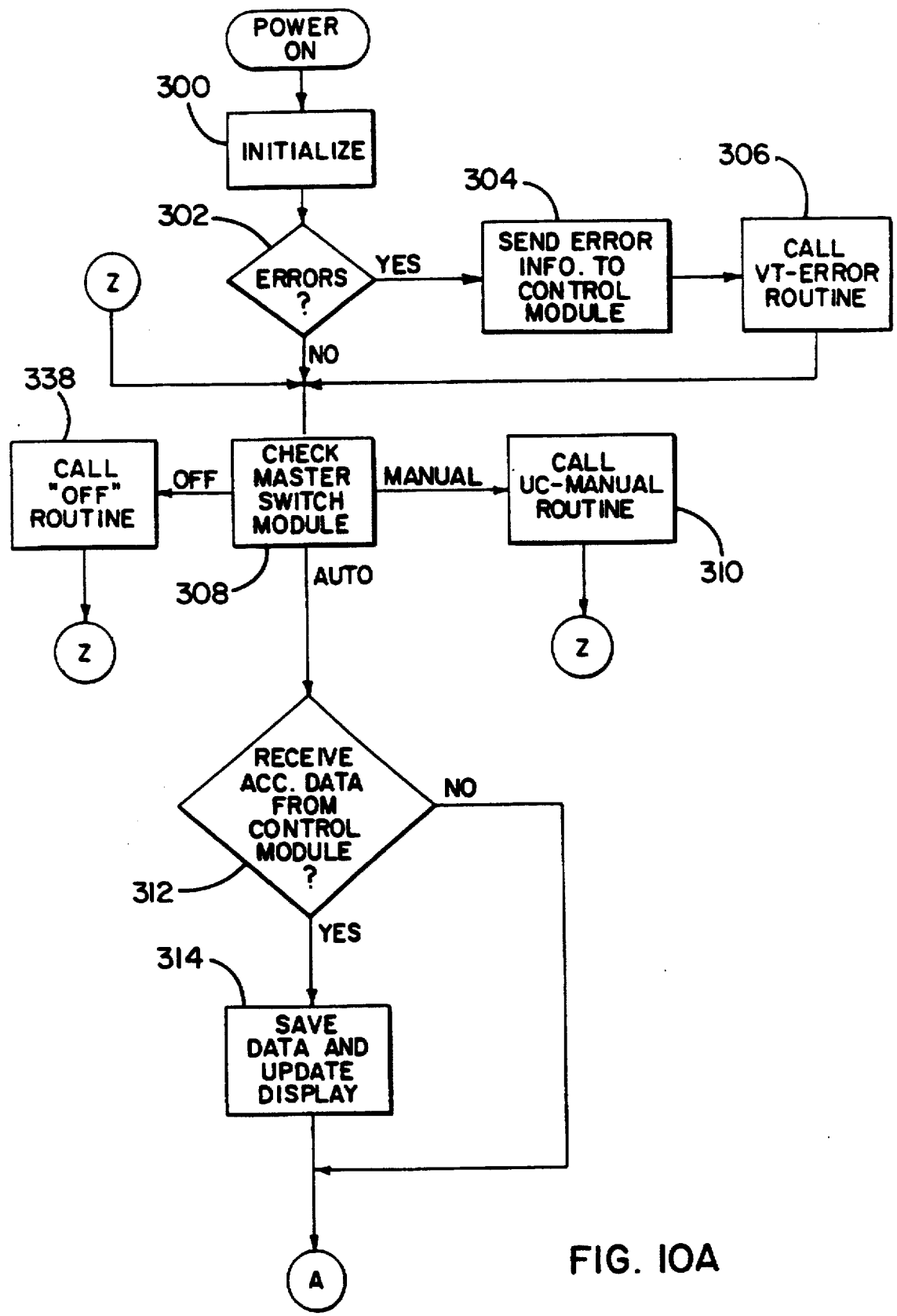
FIGS. 10A–10D comprise a flowchart illustrating the operation of the user console of the control system illustrated in FIG. 1A.

Turning to the operation of the user console 20, as illustrated in FIG. 10A, after power is supplied to the control system 10, either by starting the tractor 84 if the system 10 is hard wired to the tractor's ignition, or by flipping switch 31, the microprocessor 38 will first perform a series of housekeeping and initialization processes (step 300) similar to those discussed above in connection with the microprocessor 52 of the control module 50. Next, the microprocessor 38 will determine if any errors occurred (step 302) during the initialization step 300. If errors are detected, the microprocessor 38 advances to step 304 where it sends the noted error information to the control module 50 via the CAN bus 15 for analysis.

As discussed above in connection with FIG. 5A, when the microprocessor 52 of the control module 50 receives error information from the user console 20 at step 108, it calls the CM-ERROR routine (step 110) shown in FIG. 6, classifies the error, and returns error identification information to the user console 20.

Figure 13:
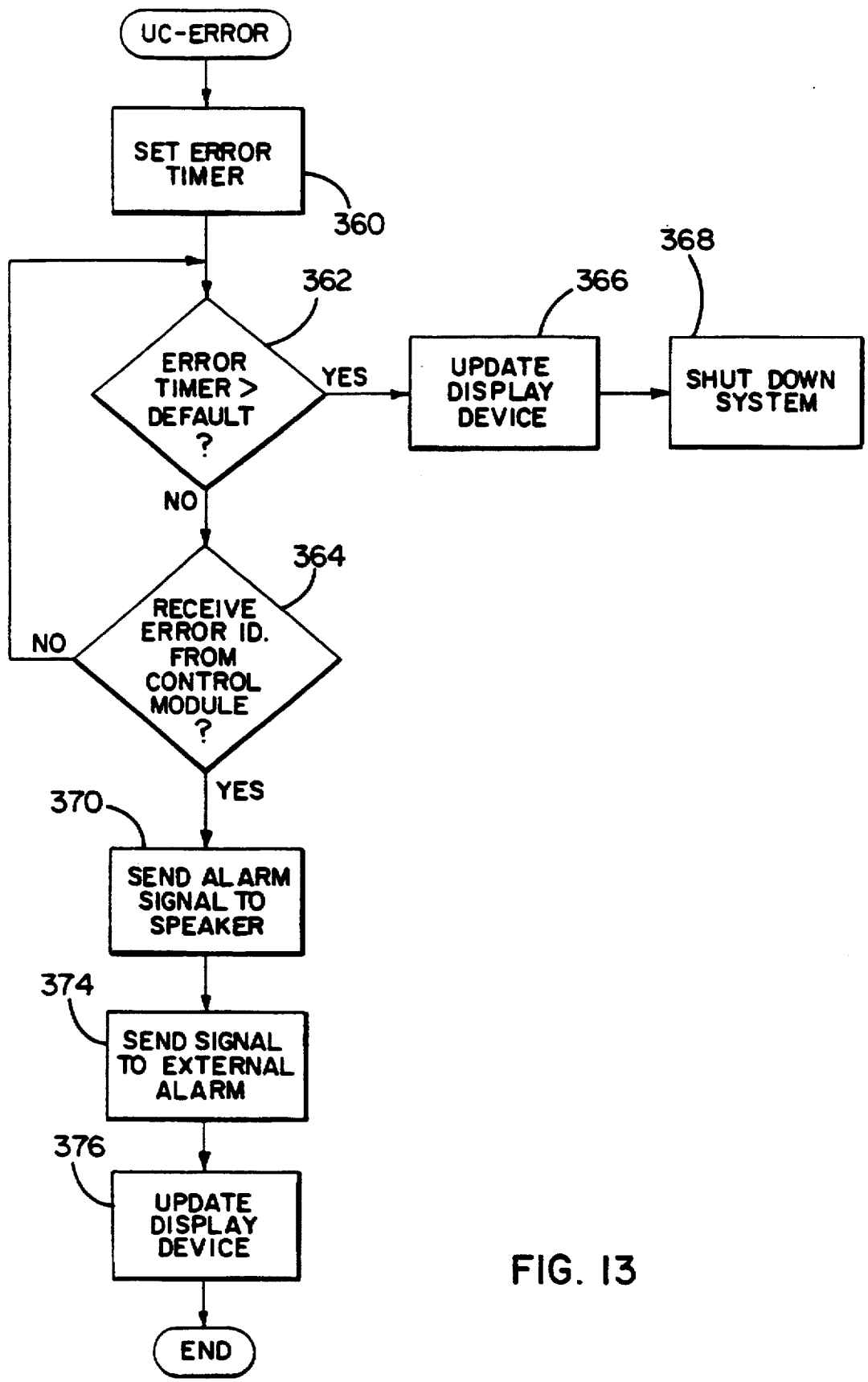
FIG. 13 comprises a flowchart illustrating the UC-ERROR routine called in the flowchart of FIGS. 10A–10D.

Meanwhile, the microprocessor 38 of the user console 20 moves to step 306 where it calls the UC-ERROR routine shown in FIG. 13. As shown in that figure, the microprocessor 38 begins the UC-ERROR routine by re-setting an error timer to zero. The microprocessor 38 will then enter a loop where it will wait to receive the error identification information from the control module 50 (steps 362 and 364). If the control module 50 does not respond with the information identifying the error within a predetermined time period, the microprocessor 38 assumes that communication has been lost with the control module 50; updates the display device 22 with a message to that effect (step 366); and shuts down until re-booted (step 368).

If the control module 50 responds with the error identification information within the default time period, the microprocessor 38 advances to step 370.

At step 370, the microprocessor 38 sends an alarm signal to the annunciator 26 of the user console 20. The alarm signal sent to the annunciator 26 will correspond to the type of error the control module 50 has identified. For example, if the control module has classified the error as a Type 1 alarm, the alarm signal could cause the alarm to output a continuous sound thereby audibly identifying the error as a Type 1 alarm. If a Type 2 alarm was identified, a different alarm signal uniquely associated with Type 2 errors would be sent to the speaker. In short, each of the five alarm types has an associated audible sound that uniquely identifies it. Therefore, the user console 20 will provide the user with an audible indication of the type of error the control system 10 has noted.

After sending an appropriate alarm signal to annunciator 26, the microprocessor 38 of the user console 20 will advance to step 374 where it will send an alarm signal to any external alarm. Since an external alarm is typically used in conditions where the alarm cannot be heard, the external alarm will usually be a visual device such as a light. Those skilled in the art will appreciate that, since, whether an external alarm is present or not, the type of error that has occurred will be visually displayed on the LCD 22 of the user console 20, the external alarm is preferably provided with a simple on/off signal to draw the user's attention to the LCD 22.

In any event, after triggering the annunciator 26 and the external alarm, the microprocessor 38 will advance to step 376. At step 376, the microprocessor 38 will cause the LCD 22 to display a visual error message containing detailed information concerning the type of error that has occurred. The microprocessor 38 will then exit the UC-ERROR routine and return to the main user console loop.

Figure 12:
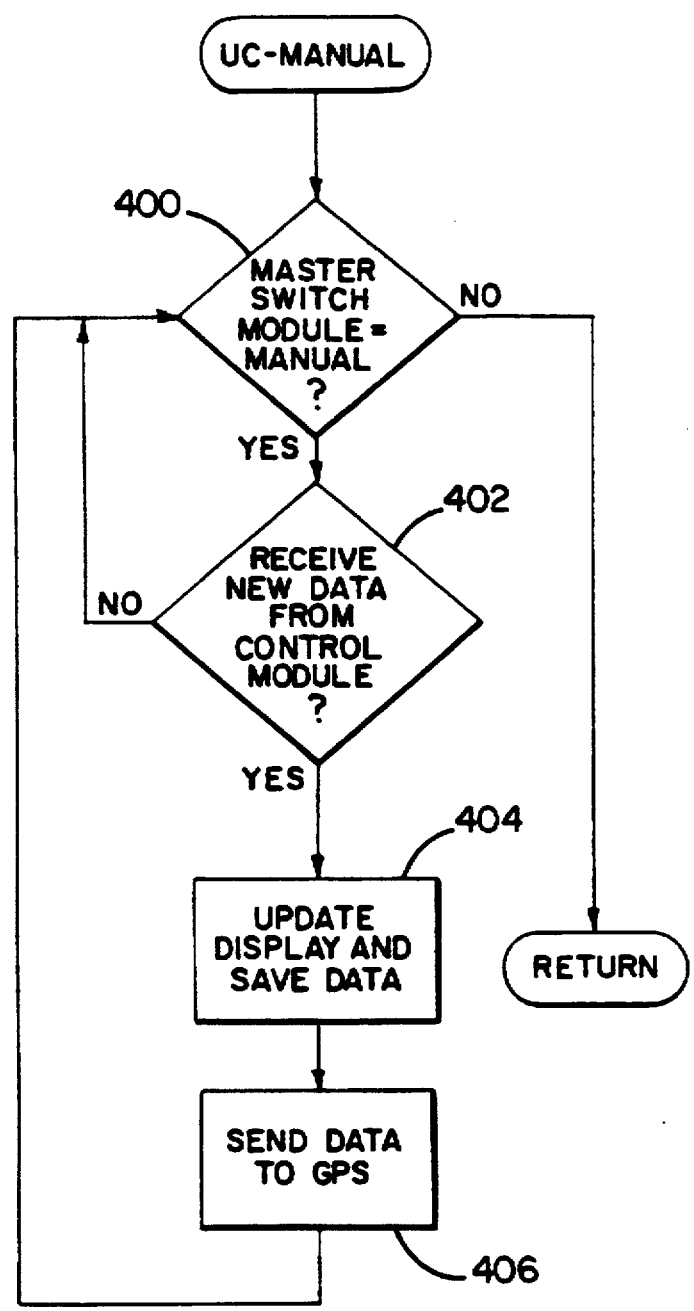
FIG. 12 is a flowchart illustrating the UC-MANUAL routine called in the flowchart of FIGS. 10A–10D.

If no errors were noted in step 302, or upon completion of step 306, the microprocessor 38 will advance to step 308 where it will check the position of the master switch module 95. If the master switch module 95 is transitioned to the Manual position, then the microprocessor 38 will advance to step 310 where it will call the UC-MANUAL routine illustrated in FIG. 12. As shown in FIG. 12, upon entering the UC-MANUAL routine the microprocessor 38 first verifies that the master switch 95 is indeed in the Manual position (step 400). If the master switch 95 is not in the Manual mode position, the microprocessor 38 immediately exits the UC-MANUAL routine. Otherwise, the microprocessor 38 will remain in a loop between step 400 and step 402 until the master switch 95 is moved from the Manual mode or until the microprocessor 38 of the user console 20 receives new data from the control module 15 via the CAN bus 15. Upon receipt of such new data, the microprocessor 38 will update the display device 22 and save the new data to its associated memory 40 (step 404). The microprocessor 38 will then send the new data received from the control module to an attached global positioning system (if one is employed) at step 406. It will then return to the loop defined by steps 400 and 402 until the master switch 95 is moved from the Manual position or until additional new data is received from the control module 50.

Upon exiting the UC-MANUAL routine (step 310) the microprocessor 38 will again check the position of the master switch 95 (step 308). If the master switch 95 is transitioned to the Auto position, microprocessor 38 will advance to step 312 where it will determine whether it has received any data concerning the accessories coupled to input ports 68 from the control module 50. If any such accessory data has been received from the control module 50 via the CAN bus 15, the microprocessor will advance to step 314 where it will save the received accessory data and update the accessory data displayed on the display device 22. If no accessory data has been received from the control module 50, the microprocessor will skip step 314 and will advance to step 316. At that step, the microprocessor 38 will determine whether it has received any data concerning the operation of the channels operated by the control module 50. Channel data could include information such as distribution rates and the like. In any event, if any channel data is received from the control module 50, the microprocessor 38 will save that data and update the channel data information displayed on the display device 22 (step 318). If the microprocessor 38 determines at step 316 that no channel data has been received from the control module, it skips step 318 and advances to step 320.

At step 320, the microprocessor 38 will determine whether it has received any boom data from the control module 50. Boom data would include information concerning the operating state of the individual boom sections coupled to the boom sense line inputs 70. If any such boom data has been received from the control module 50, the microprocessor 38 will save that data and will update the boom data displayed by the visual device 22. The updating of the display device 22 would include changing the coloration of any boom section whose operating state has changed in the graphical representation 11 illustrated by way of example in FIG. 15. If the microprocessor 38 determines at step 320 that no boom data has been received from the control module 50, it will skip step 322 and advance to step 324 shown in FIG. 10C.

At step 324, the microprocessor 38 will forward the data received from the control module to an attached GPS system if one is employed. This data preferably includes real time boom operation information including an identification of which boom sections were on and which were off, the locations and sizes of those sections, and the amount of material applied by each section. It also preferably includes a formal report including information concerning the total amount of material distributed, the location of the material application and the state of the Master Switch module 95.

Subsequently, the microprocessor 38 will advance to step 326 where it will determine whether it has received any new error identification information from the control module 50. If any error identification information is received at this point, those skilled in the art will appreciate from the foregoing description of the operation of the control module 50, that the newly received error identification information will relate to errors noted by the control module 50 as opposed to errors noted by the user console 20. In any event, if any such error information is received, the microprocessor 38 will call the UC-ERROR routine (step 328) which was described above in connection with step 306.

Assuming that the control module has not forwarded new error identification information, the microprocessor 38 will advance to step 330. At step 330 the microprocessor 38 will determine whether it has received any GPS data from a GPS system. If it has, the microprocessor 38 will immediately forward that information to the control module 50 via the CAN bus 15 (step 332). If no GPS data has been received, the microprocessor 38 will skip step 332 and advance to step 334 (FIG. 10D).

At step 334, the microprocessor 38 will determine whether it has received any speed data from a speed monitoring device attached at input port 47. If such speed data has been received, the microprocessor 38 will forward that information to the control module 50 via the CAN bus 15 (step 336). If no speed data has been received, step 336 will be skipped. In any event, the microprocessor 38 will loop back up to step 308 (FIG. 10A) where it will again determine the state of the master switch 95.

Figure 11A:
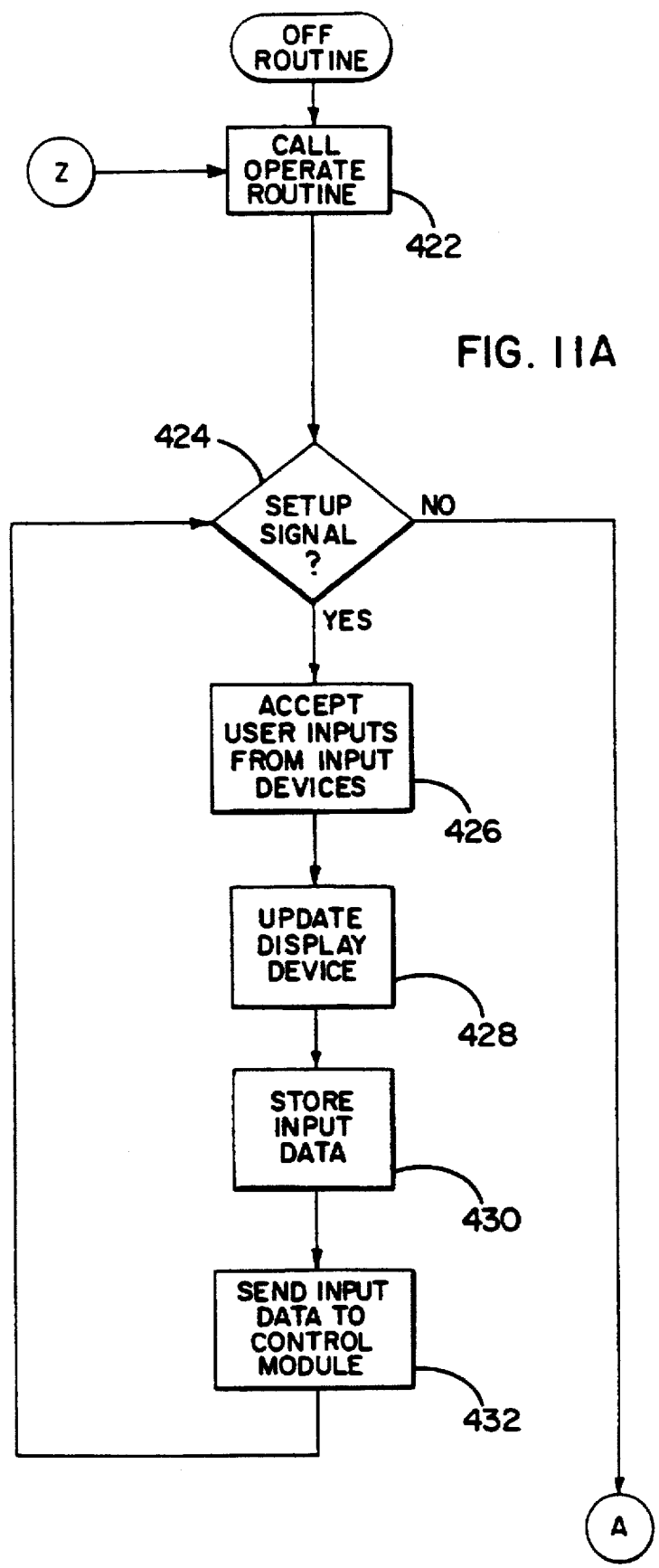
FIGS. 11A–11C comprise a flowchart illustrating the OFF routine called in the flowchart of FIGS. 10A–10D.
Figure 11B:
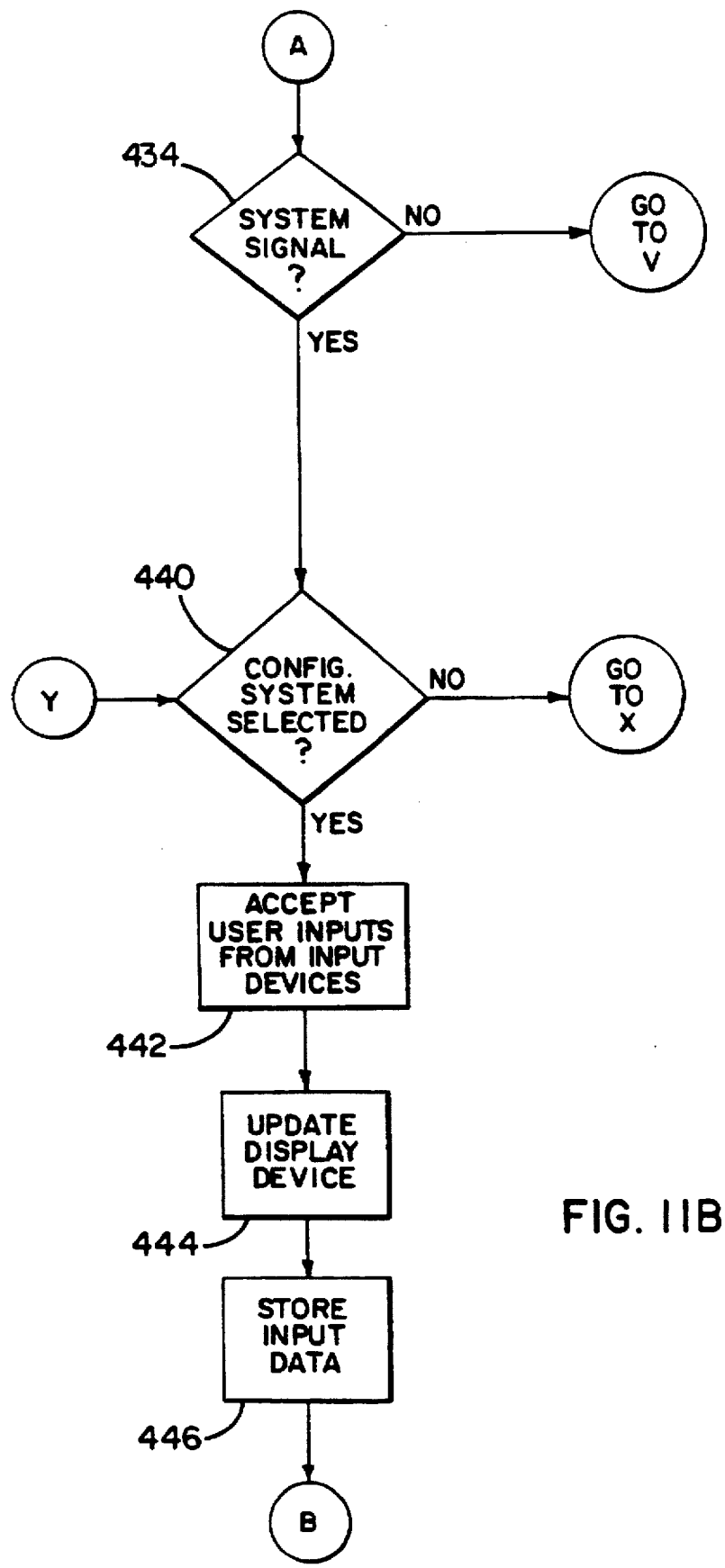
Figure 11C:
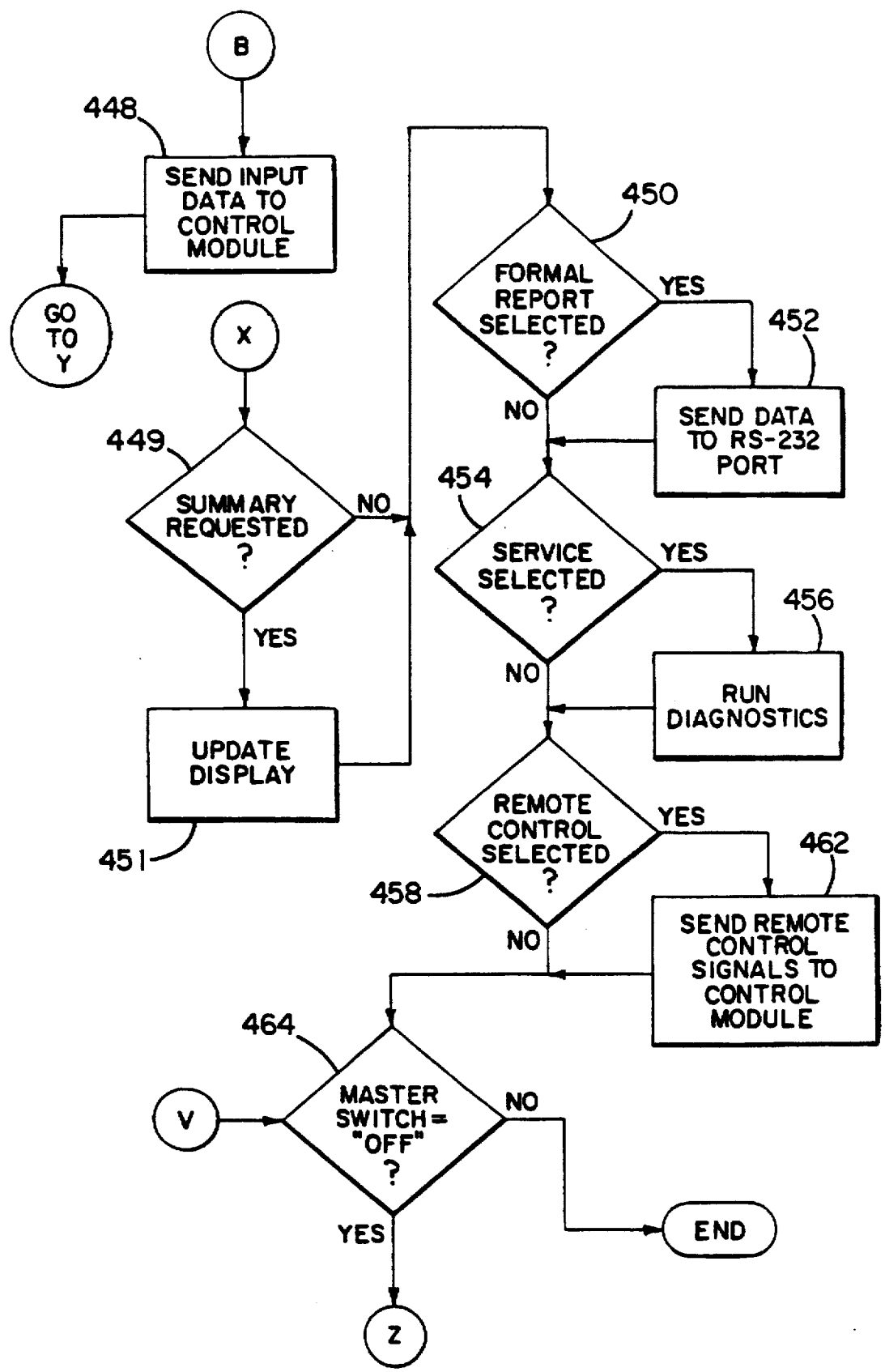

If at step 308, the microprocessor 38 determines that the master switch 95 is in the Off mode position, the microprocessor 38 will advance to step 338 (FIG. 10A) where it will call the Off routine illustrated in FIGS. 11A–11C.

As shown in FIG. 11A, the microprocessor 38 begins the Off routine by calling the OPERATE routine.

Figure 14A:
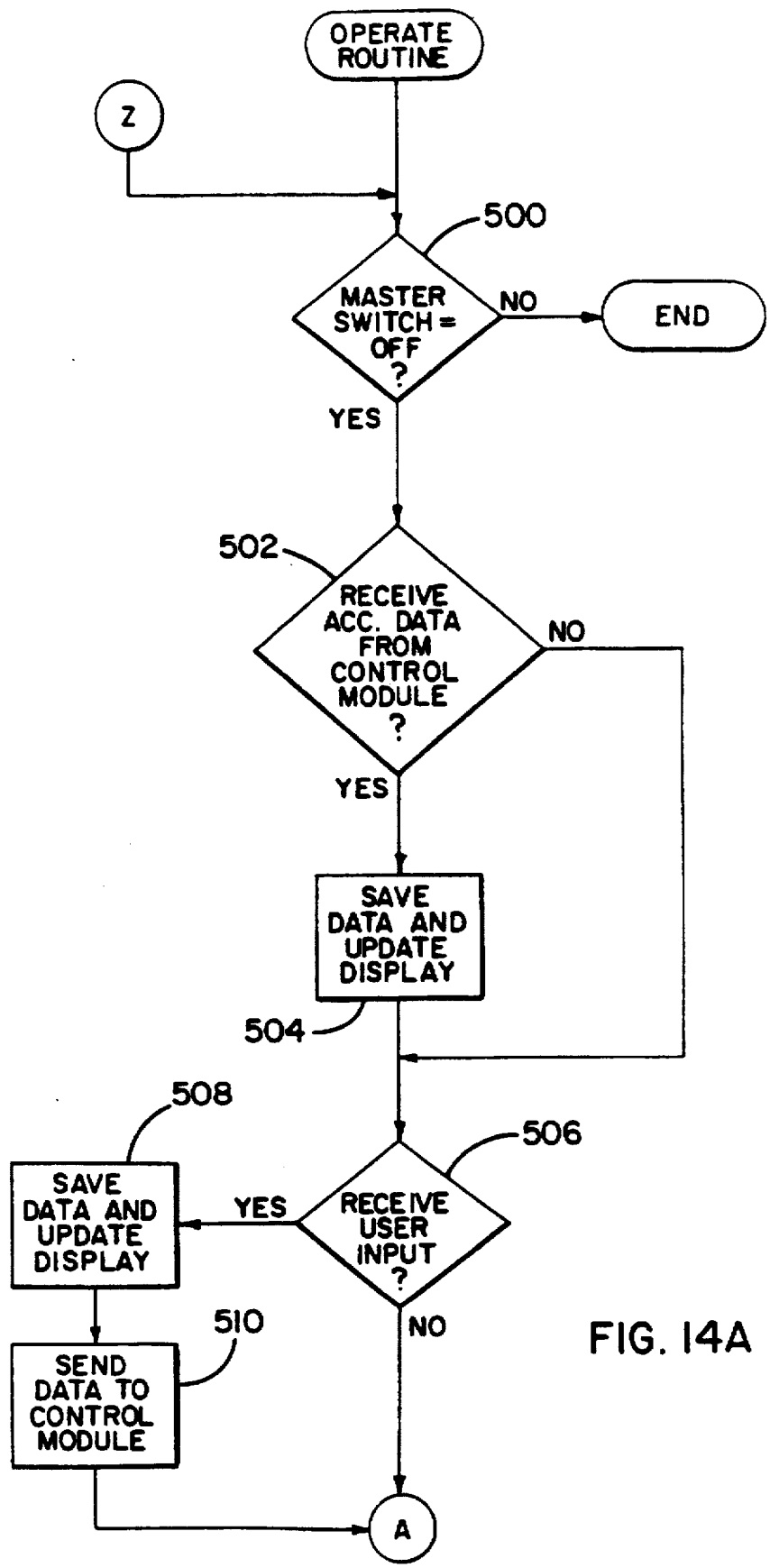
FIGS. 14A–14D comprise a flowchart illustrating the OPERATE routine called by the flowchart of FIGS. 11A–11C.

In the OPERATE routine (FIG. 14A) the microprocessor 38 first determines whether the master switch 95 is in the Off position. If the master switch is not in the Off position, the microprocessor 38 will immediately return to the OFF routine at block 424. Otherwise, the microprocessor 38 will advance to step 502 in the OPERATE routine (FIG. 14A). Assuming for purposes of discussion, that the master switch is in the Off position and the microprocessor 38 has advanced to step 502 in the OPERATE routine, the microprocessor 38 will determine whether it has received any accessory data from the control module 50. If so, it will save that accessory data and update the display device 22 (step 504). If no accessory data has been received from the control module 50, the microprocessor 38 will skip step 504 and advance to step 506.

At step 506, the microprocessor 38 will determine whether the user has input any data via the input devices 24. If the user has input data in this manner, the microprocessor 38 will save the input data and update the display device 22 with that new information (step 508). The microprocessor 38 will then send any data received from the user to the control module 50 via the CAN bus 15 (step 510) and then advance to step 516. If the microprocessor 38 determines in step 506 that the user has not input any further data, it will skip steps 508 and 510 and advance to step 516 (FIG. 14B).

Figure 10B:
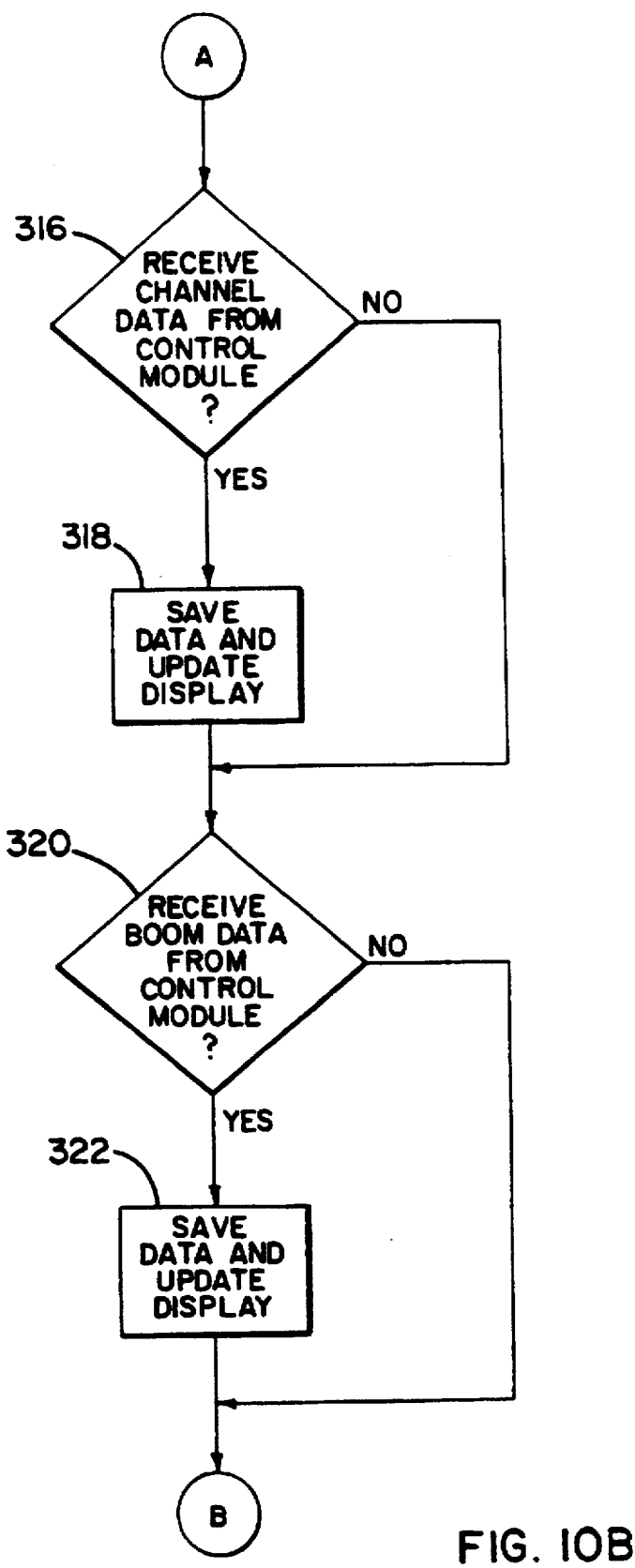
Figure 10C:
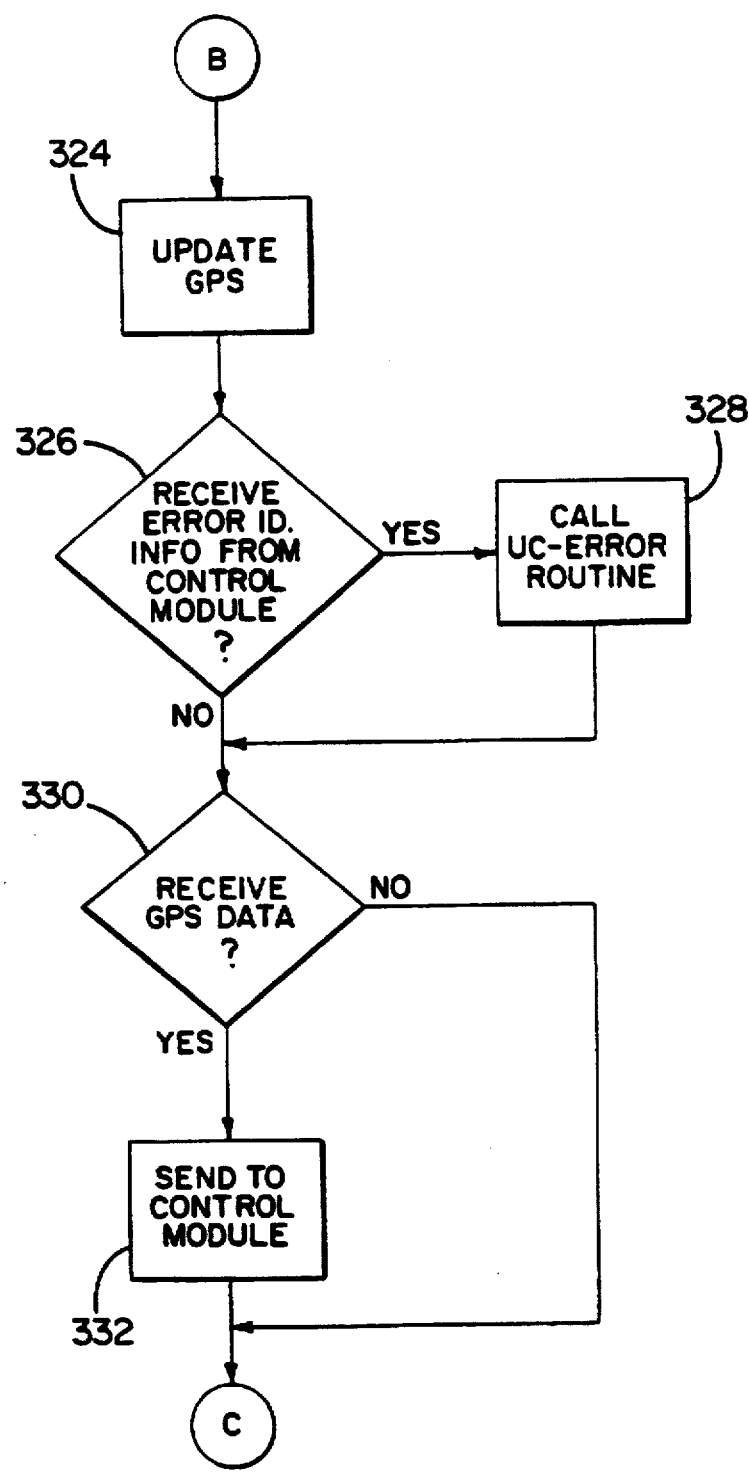
Figure 10D:
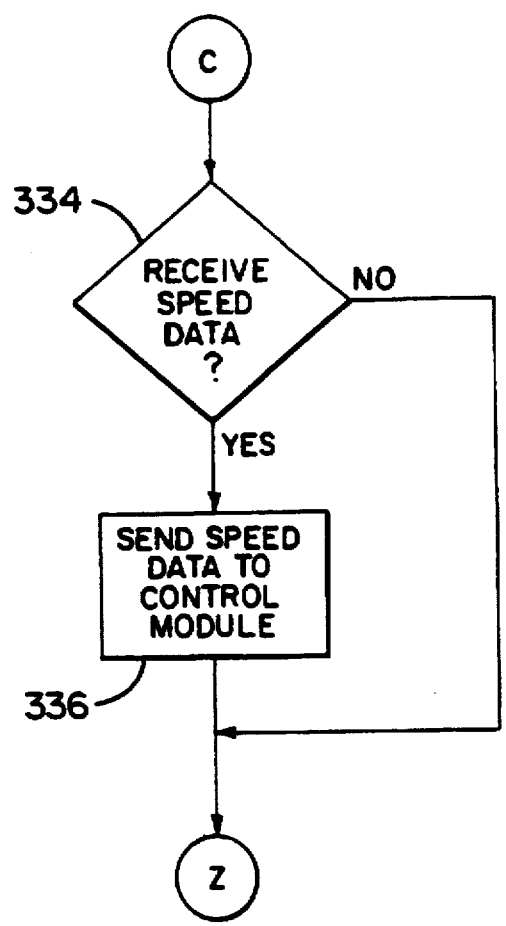
Figure 14B:
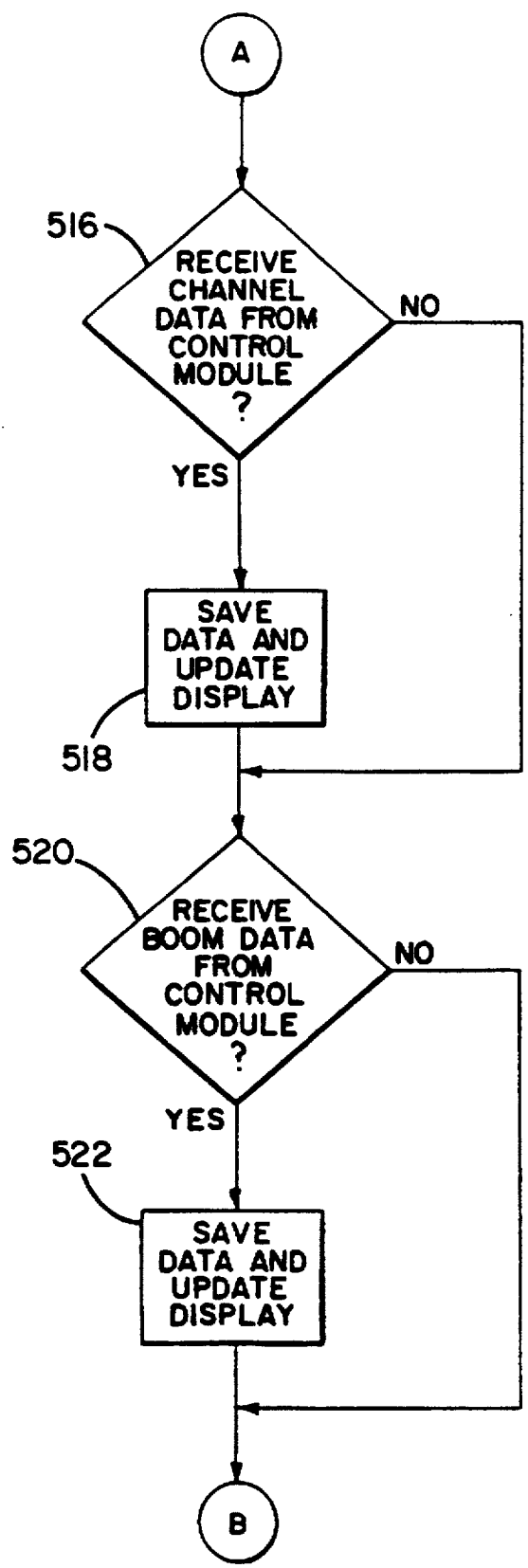
Figure 14C:
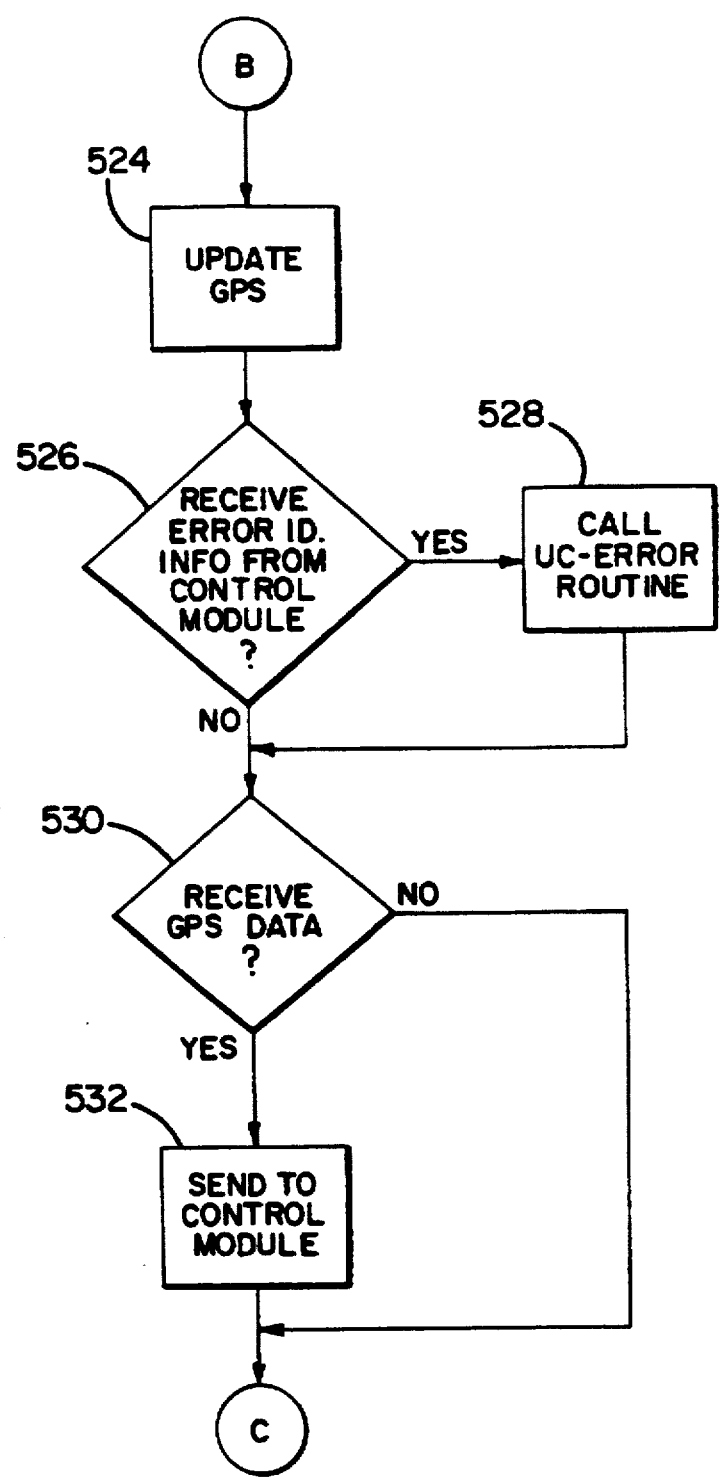
Figure 14D:
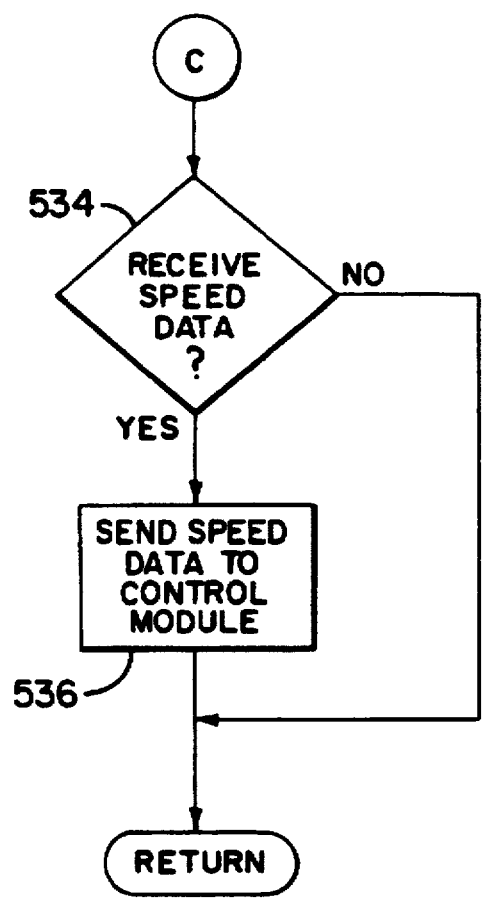

Those skilled in the art will appreciate that steps 516–536 of FIGS. 14B–14D are identical to steps 316–336 of FIGS. 10B–10D. The reference numerals employed in these figures have been chosen to reflect this correspondence. Specifically, step 516 corresponds to step 316, step 518 corresponds to step 318, step 520 corresponds to step 320, etc. In view of this correspondence, the explanation of steps 316–336 will not be repeated here. Instead, the interested reader is referred to the discussion of steps 316–336 above for a complete discussion of steps 516–536 of FIGS. 14B–14D.

Returning to FIG. 11A and assuming that the OPERATE routine has been exited (step 538 in FIG. 14D and step 422 in FIG. 11A), the microprocessor will, at step 424, determine whether Setup key 36 has been depressed by the user. If so, the microprocessor 38 will advance to step 426 where it will accept user inputs from the input devices 24. If any such inputs are received from the user, the microprocessor will update the display device 22 (step 428), store the date input by the user (step 430), and send any data input by the user to the control module 50 via the CAN bus 15 (step 423). The microprocessor 38 will continue to loop through steps 424–432 until the user indicates that the Setup state should be exited at which point the microprocessor 38 will advance to step 434.

At step 434, the microprocessor 38 will determine whether the user has switched system switch 37 to the SYSTEM state. If not, the microprocessor 38 will skip to step 464 (FIG. 11C) explained below.

Assuming that the System key 37 has been depressed, the microprocessor 38 will advance to step 440. At step 440, the microprocessor will determine whether the user has selected a Configuration key corresponding to one of the six Function keys 32. If not, the microprocessor 38 will skip to step 450 (FIG. 11C). Otherwise, the microprocessor 38 will enter the Configure System mode where it will accept inputs from the user via the input devices 24 (step 442), update the display device 22 with the user inputs (step 444), store the data input by the user (step 446), and send the data input by the user to the control module 50 via the CAN bus 15 (step 448). Preferably, this series of steps is used to enter System Configuration data concerning variables such as Boom Assignment, Drive Frequency, and Input Filter Valve. In any event, the microprocessor 38 will continue to loop through steps 440–448 until the user indicates that this mode should be exited (step 440).

Preferably, the control system 10 is programmed to provide a summary of the current settings of the system 10 in response to a suitable prompt from a user (block 449). This summary is preferably a view only file compiled by the system 10 to provide a user with quick reference to the system settings. This feature is useful for performing diagnostics and servicing the system. In the preferred embodiment, if a user requests a summary (block 449), the request is forwarded to the microprocessor 52 of the control module 50 which compiles the requested information and provides the microprocessor 38 of the user console 20 with data to be displayed to the user. The microprocessor 38 of the user console 20 will then cause the display device to display the data received from the control module 50 (block 451).

Upon leaving block 449 or 451, the microprocessor 38 will advance to step 450 (FIG. 11C). At step 450, the microprocessor 38 will determine whether the user has selected the Function key 32 which indicates that a user wishes to output a formal report. If that key has been selected, the microprocessor 38 will forward the user's request to the control module 50 via the CAN bus. Upon receiving the request, the microprocessor 52 will generate the requested report and forward the report to the user console 20 where it will be output to the RS-232 port 48. Those skilled in the art will appreciate that formal reports can be configured in any desirable manner. One such formal report would include the error list discussed above. Another formal report, could include data concerning the amount of materials applied to a field as well as an identification of the field treated.

If the user has not selected the Formal Report key 32 the microprocessor will advance to step 454. At step 454, the microprocessor 38 will determine whether the Function key 32 assigned to the Service selection has been selected by a user. If that key has been depressed, the microprocessor 38 will advance to step 456 where it will forward the user's service request to the microprocessor 52 of the control module. Microprocessor 52 will perform certain diagnostic tests in response to the users requests.

If the Service key is not selected, the microprocessor will advance to step 458. At step 458, the microprocessor 38 will determine whether the user has selected the Function key 32 corresponding to a Remote Control selection. If so, the microprocessor will configure itself to send any remote control signals received via the RS-232 port 48 to the control module 50 over the CAN bus 15 (step 462). If the Remote Control selection key is not depressed at step 458, the microprocessor 38 will advance to step 464. At step 464, the microprocessor will determine whether the master switch 95 is still in the Off position. If not, the microprocessor 38 will exit the OFF routine and return to step 308 of the main user console loop (FIG. 10A). Otherwise, if the master switch 95 is still in the Off position, the microprocessor 38 will loop back to step 420 (FIG. 11A) where it will continue to loop through the OFF routine until the master switch 95 is switched out of the Off mode.

One important aspect of the invention is that the user console 20 is relatively "dumb." At a basic level, its function is to monitor system inputs, including the actuation of keys by the user, and send any input data to the control module, send ground speed data to the control module (in cases where the ground speed sensor is connected to the user console), and display information for the benefit of the user. As such, it is not necessary that the user console play any role in executing the control functions of the system 10. Stated another way, the significance of data input to the system or displayed by the system is, generally speaking, of no moment to the tasks executed by the user console 20.

Figure 16:
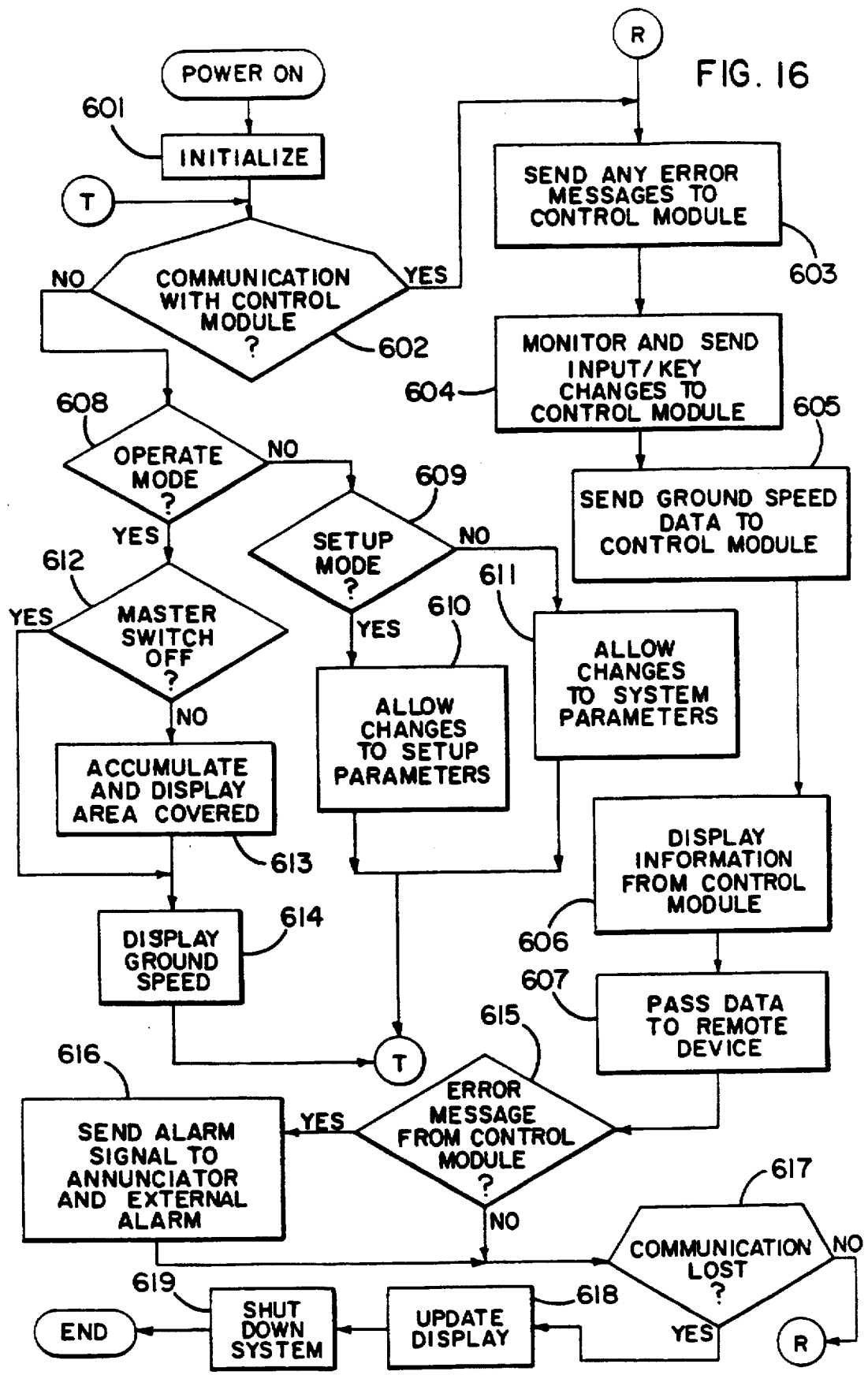
FIG. 16 alternatively illustrates, in flowchart form, the operation of a preferred user console in accordance with the invention.

In this light, FIG. 16 alternatively illustrates the routines executed by a preferred embodiment of user console 20. FIG. 16 should be taken in conjunction with FIGS. 10–14. After power-up, the system is initialized (step 601) as in step 300 in FIG. 10A. Thereafter, at step 602, a determination is made as to whether a communication link exists with any control module 50.

If communication exists, the user console 20 sends any error messages to the control module 50 (step 603), monitors inputs and keys and sends any changes to the control module 50 (step 604), sends any ground speed data to the control module 50 (step 605), displays information received from the control module 50 (step 606), and passes appropriate data, if any, to any remote device (step 607). A decision is then made, at block 615, as to whether an error message has been received from control module 50. If so, an alarm is actuated (step 616). Then, or if no error message has been received, a decision is made at block 617 as to whether communication with control module 50 has been lost. These simple steps are repeatedly performed as long as communication with the control module is established. As such, the control module 50 determines the significance of any inputs received by the user console 20 and determines and generates the information to be displayed by user console 20. If, at block 617, it is determined that communication has been lost, then the display will so indicate (step 618) and the system will be shut down (step 619).

In the event that, at step 602, communication does not exist with control module 50, it will be possible for the user console 20 to enter a "stand alone" mode of operation, as describe below. First, a decision is made, at block 608, whether the user console is in the "operate" mode. If not, a decision is made, at block 609, whether the user console is in the "setup" mode. If so, the user console 20, will permit, at step 610, the operator to change appropriate "setup" parameters, such as effective vehicle width, as described above. If, at block 609, it is determined that the user console 20 is not in the "setup" mode, the user console 20 is assumed to be in the "system" mode. Accordingly, at step 611, the user will be permitted to change appropriate "system" parameters, as described above.

If, at block 608, it is determined that the user console 20 is in the "operate" mode, the user console will function as a "stand alone" monitor. First, at block 612, a determination will be made as to whether master switch 95 is off. If not, the user console 20 will monitor ground speed and any other available inputs, and thereby accumulate and display the area covered by the apparatus (step 613). The user console 20 also will display ground speed (step 614). If, at block 612, it is determined that the master switch 95 is off, the user console 20 will display ground speed only (step 614). As long as there is no communication with control module 50, user console 20 will continue to function as a stand alone monitor, as described.

Although not illustrated in the flow charts, the control system 10 is preferably programmed with certain additional features. For example, in the preferred embodiment the control system 10 includes two user definable libraries, namely, a chemical library and a nozzle library. As their names suggest, these libraries preferably include lists of chemicals and nozzles, respectively, including information useful in configuring the control system 10 employ the items listed in the lists. If a user scrolls through one of these lists and selects an item on that list, the system 10 will preferably automatically configure itself for use with the selected item.

Another preferred feature of the inventive system relates to security. Specifically, the control system 10 is preferably programmed to require the use to enter a password before accessing the system configuration or setup menus to change the operating parameters of the system 10. In the preferred embodiment a password must be entered to enter the system mode (steps 440–448 in FIGS. 11B–11C) and a distinct password must be entered to access the SETUP mode (steps 424–432 in FIG. 11A). Since these two passwords are user definable, the user can optionally employ a single password to access both menus.

Another feature preferably included in the control system 10 is on-line help. As its name suggests, this feature provides the user with information useful in running the system 10 upon request from the user. Preferably, the right-hand special function Key 34 of the user console 20 is a help key that permits the user to access the on-line help feature. In the preferred embodiment, the on-line help feature is position sensitive; displaying information relevant to the particular task the user is undertaking at the time the help Key 34 is selected.

It should be noted that the second special function Key 34 is preferably an escape key used to move between menus during system use.

Although the inventive control system 10 has been described as a multi-component system having a separate user console 20 and control module 50, those skilled in the art will appreciate that the control system 10 can be implemented in a single housing without departing from the scope or spirit of the invention. Indeed, in a preferred embodiment, the control system 10 is constructed in a single housing (except for an external Master Switch 95), and does not include an alphanumeric Keypad 24, but may include alphanumeric data entry capability using other means.

While particular embodiments of the invention have been shown, it will be understood, of course, that the invention is not limited thereto. Since modifications may be made to the disclosed structures by these skilled in the art particularly in light of the foregoing teachings without departing from the invention, the appended claims are intended to cover all structures, regardless of modifications, that fall within the scope and spirit of the instant invention whether or not such structures are specifically described herein.

What is claimed is:

1. A control system for controlling the operation of a mobile material distribution apparatus comprising:

an input device and an output device for interacting with a user;

a microprocessor having at least one input port and at least one output port arranged to form at least one feedback loop for controlling an attached material distribution apparatus, the microprocessor being adapted to detect errors; and a memory associated with the microprocessor for storing error identification information received from the microprocessor;

wherein the microprocessor causes the memory to store the error identification information in chronological order; and wherein the error identification information includes a proposed solution to the error.

2. A control system as defined in claim 1 wherein the microprocessor classifies each error into at least one of a plurality of categories; and wherein the control system further comprises an audible device coupled to the microprocessor for generating audible alarm signals in response to the detection of an error, the microprocessor driving the audible device to produce audible alarm signals corresponding to the category of error the microprocessor has detected.

3. A control system as defined in claim 1 wherein the error detection information includes the time and date at which an error was detected and a description of the detected error.

4. A control system as defined in claim 1 wherein the output device includes a display for displaying error information.

5. A control system for controlling the operation of a mobile material distribution apparatus comprising:
   an input device and an output device for interacting with a user;
   a microprocessor having at least one input port and at least one output port arranged to form at least one feedback loop for controlling an attached material distribution apparatus, the microprocessor being adapted to detect errors; and
   a memory associated with the microprocessor for storing error identification information received from the microprocessor;
   wherein the microprocessor is adapted to only save the same error to the memory a predetermined number of times; and
   wherein, when an error occurs after it has already been saved the predetermined number of times, the microprocessor deletes the oldest error from the memory and stores the most current error.

6. A control system as defined in claim 5 wherein the microprocessor classifies each error into at least one of a plurality of categories; and wherein the control system further comprises an audible device coupled to the microprocessor for generating audible alarm signals in response to the detection of an error, the microprocessor driving the audible device to produce audible alarm signals corresponding to the category of error the microprocessor has detected.

7. A control system as defined in claim 5 wherein the error detection information includes the time and date at which an error was detected and a description of the detected error.

8. A control system as defined in claim 5 wherein the output device includes a display for displaying error information.

9. A control system for controlling the operation of a mobile material distribution apparatus comprising:
   an input device and an output device for interacting with a user;
   a microprocessor having at least one input port and at least one output port arranged to form at least one feedback loop for controlling an attached material distribution apparatus, the microprocessor being adapted to detect errors; and
   a memory associated with the microprocessor for storing error identification information received from the microprocessor;
   wherein the microprocessor is adapted to only save the same error to the memory a predetermined number of times; and
   wherein the predetermined number is three.

10. A control system as defined in claim 9 wherein the microprocessor classifies each error into at least one of a plurality of categories; and wherein the control system further comprises an audible device coupled to the microprocessor for generating audible alarm signals in response to the detection of an error, the microprocessor driving the audible device to produce audible alarm signals corresponding to the category of error the microprocessor has detected.

11. A control system as defined in claim 9 wherein the error detection information includes the time and date at which an error was detected and a description of the detected error.

12. A control system as defined in claim 9 wherein the output device includes a display for displaying error information.

13. A control system for controlling the operation of a mobile material distribution apparatus comprising:
   an input device and an output device for interacting with a user;
   a microprocessor having at least one input port and at least one output port arranged to form at least one feedback loop for controlling an attached material distribution apparatus, the microprocessor being adapted to detect errors; and
   a memory associated with the microprocessor for storing error identification information received from the microprocessor;
   wherein the microprocessor will only store a predetermined maximum number of errors to the memory.

14. A control system as defined in claim 13 wherein, when an error occurs after the predetermined maximum number of errors have been save to the memory, the microprocessor deletes the oldest saved error and save the current error to the memory.

15. A control system as defined in claim 13 wherein the predetermined maximum number is thirty.

16. A control system as defined in claim 13 wherein the microprocessor classifies each error into at least one of a plurality of categories; and wherein the control system further comprises an audible device coupled to the microprocessor for generating audible alarm signals in response to the detection of an error, the microprocessor driving the audible device to produce audible alarm signals corresponding to the category of error the microprocessor has detected.

17. A control system as defined in claim 16 further comprising material distribution actuators which are closed in response to the detection of certain error types and which are not closed in response to the detection of other error types.

18. A control system as defined in claim 13 wherein the error detection information includes the time and date at which an error was detected and a description of the detected error.

19. A control system as defined in claim 13 wherein the output device includes a display for displaying error information.

20. Apparatus for controlling a mobile material distribution device comprising:
   a microprocessor having at least one input port and at least one output port arranged to form at least one feedback loop for controlling the distribution of material, the microprocessor being adapted to identify errors;
   a memory associated with the microprocessor for storing error identification information received from the microprocessor; and
   a user interface having a display for displaying error identification information to a user in response to the identification of an error by said microprocessor;
   wherein said error identification information includes a proposed solution to the error.

21. Apparatus for controlling a mobile material distribution device comprising:
   a microprocessor having at least one input port and at least one output port arranged to form at least one feedback loop for controlling the distribution of material, the microprocessor being adapted to identify errors;
   a memory associated with the microprocessor for storing error identification information received from the microprocessor; and a user interface having a display for displaying error identification information to a user in response to the identification of an error by said microprocessor;

wherein the microprocessor classifies each error into at least one of a plurality of categories; and wherein the apparatus further comprises an audible device coupled to the microprocessor for generating audible alarm signals in response to the identification of an error, the microprocessor driving the audible device to produce audible alarm signals corresponding to the category of error the microprocessor has identified.

22. Apparatus for controlling a mobile material distribution device comprising:

a microprocessor having at least one input port and at least one output port arranged to form at least one feedback loop for controlling the distribution of material, the microprocessor being adapted to identify errors;

a memory associated with the microprocessor for storing error identification information received from the microprocessor; and a user interface having a display for displaying a visual error message to the user based upon the stored error identification information, including the time at which an error was identified and a description of the error.

23. Apparatus as recited in claim 22, wherein said error identification information includes a proposed solution to the error.

* * * * *